United States Patent
Yang et al.

(10) Patent No.: US 12,003,287 B2
(45) Date of Patent: Jun. 4, 2024

(54) UPLINK CHANNEL CONFIGURATION METHOD, UPLINK CHANNEL TRANSMISSION METHOD, NETWORK-SIDE DEVICE, AND TERMINAL

(71) Applicant: VIVO MOBILE COMMUNICATION CO., LTD., Guangdong (CN)

(72) Inventors: Yu Yang, Guangdong (CN); Peng Sun, Guangdong (CN); Zhi Lu, Guangdong (CN); Xiaodong Sun, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 392 days.

(21) Appl. No.: 17/368,919

(22) Filed: Jul. 7, 2021

(65) Prior Publication Data

US 2021/0336664 A1    Oct. 28, 2021

Related U.S. Application Data

(63) Continuation of application No. PCT/CN2020/070075, filed on Jan. 2, 2020.

(30) Foreign Application Priority Data

Jan. 11, 2019   (CN) .................. 201910028852.4

(51) Int. Cl.
*H04B 7/0456* (2017.01)
*H04L 5/00* (2006.01)
(Continued)

(52) U.S. Cl.
CPC ......... *H04B 7/0456* (2013.01); *H04L 5/0048* (2013.01); *H04W 72/21* (2023.01); *H04W 72/23* (2023.01)

(58) Field of Classification Search
None
See application file for complete search history.

(56) References Cited

U.S. PATENT DOCUMENTS 11,234,148 B2 *  1/2022  Qin ..................... H04W 72/12
2015/0372732 A1  12/2015  Kim et al.
(Continued)

FOREIGN PATENT DOCUMENTS

CA       3052397 A1   10/2018
CN    101309497 A   11/2008
(Continued)

OTHER PUBLICATIONS

Written Opinion of the International Search Authority, for International Application No. PCT/CN2020/070075, dated Jan. 2, 2020.
(Continued)

*Primary Examiner* — Phirin Sam
(74) *Attorney, Agent, or Firm* — Price Heneveld LLP

(57) ABSTRACT

This disclosure provides an uplink channel configuration method, an uplink channel transmission method, a network-side device, and a terminal. The uplink channel configuration method is applied to a network-side device and includes: sending indication information to a terminal, where the indication information is used to indicate an uplink channel related transmission parameter, the transmission parameter corresponds to N uplink channels and/or at least two target transmissions of a target uplink channel, and N is an integer greater than 1.

19 Claims, 4 Drawing Sheets

Perform transmission of an uplink channel according to an uplink channel related transmission parameter, where the transmission parameter corresponds to N uplink channels and/or at least two target transmissions of a target uplink channel, and N is an integer greater than 1 — 401

(51) Int. Cl.
*H04W 72/21* (2023.01)
*H04W 72/23* (2023.01)

(56) References Cited

U.S. PATENT DOCUMENTS

| | | | |
|---|---|---|---|
| 2017/0289869 | A1 | 10/2017 | Nogami et al. |
| 2018/0103433 | A1 | 4/2018 | Li et al. |
| 2018/0302206 | A1 | 10/2018 | Kang et al. |
| 2019/0116005 | A1 | 4/2019 | Harada et al. |
| 2019/0124538 | A1 | 4/2019 | Tang et al. |
| 2019/0124631 | A1 | 4/2019 | Ren et al. |
| 2019/0140729 | A1* | 5/2019 | Zhang .................. H04W 52/16 |
| 2019/0149365 | A1* | 5/2019 | Chatterjee ............ H04L 5/0094 370/329 |
| 2019/0357286 | A1* | 11/2019 | Pang .................. H04B 7/15542 |
| 2020/0068539 | A1 | 2/2020 | Liu et al. |
| 2020/0119783 | A1 | 4/2020 | Liu et al. |
| 2020/0169304 | A1 | 5/2020 | Chen et al. |
| 2020/0186226 | A1* | 6/2020 | Zhang .................. H04L 1/0004 |
| 2020/0267803 | A1* | 8/2020 | Kwak ................. H04L 27/2605 |
| 2021/0136768 | A1 | 5/2021 | Kang et al. |
| 2021/0243780 | A1* | 8/2021 | Han ...................... H04W 72/20 |
| 2021/0258995 | A1* | 8/2021 | Tang .................... H04L 5/0064 |
| 2021/0360682 | A1* | 11/2021 | Jung .................... H04L 5/0055 |
| 2022/0417974 | A1* | 12/2022 | Lee ....................... H04L 5/0048 |
| 2023/0269738 | A1* | 8/2023 | Lee ....................... H04L 5/0048 370/330 |

FOREIGN PATENT DOCUMENTS

| | | |
|---|---|---|
| CN | 102223720 A | 10/2011 |
| CN | 102255705 A | 11/2011 |
| CN | 108112075 A | 6/2018 |
| CN | 108282207 A | 7/2018 |
| CN | 108811149 A | 11/2018 |
| CN | 108964863 A | 12/2018 |
| CN | 109076584 A | 12/2018 |
| CN | 109150471 A | 1/2019 |
| EP | 2897318 A1 | 1/2014 |
| WO | 2017170889 A1 | 10/2017 |
| WO | 2018128365 A1 | 7/2018 |

OTHER PUBLICATIONS

Huawei, "Discussion on UL multi-panel/TRP operation", 3GPP TSG RAN WG1 Meeting NR Ad Hoc #3, R1-1715719, Nagoya, Japan, Sep. 18-21, 2017.
"3rd Generation Partnership Project; Technical Specification Group Radio Access Network; NR; Radio Resource Control (RRC) protocol specification (Release 15)", 3GPP TS 38.331 V15.4.0 (Dec. 2018), Valbonne, France.
"3rd Generation Partnership Project; Technical Specification Group Radio Access Network; NR; Physical layer procedures for data (Release 15)", 3GPP TS 38.214 V15.4.0 (Dec. 2018), Valbonne, France.
"3rd Generation Partnership Project; Technical Specification Group Radio Access Network; NR; Multiplexing and channel coding (Release 15)", 3GPP TS 38.212 V15.1.0 (Dec. 2018), Valbonne, France.
Samsung, "Corrections on UL Beam Management", 3GPP TSG RAN WG1 Meeting #92bis, R1-1804362, Sanya, China, Apr. 15-20, 2018.
ZTE, "Details and evaluation results on beam indication", 3GPP TSG RAN WG1 Meeting NR#3, R1-1715445, Nagoya, Japan, Sep. 18-21, 2017.
Xuejun et al., "Adaptive Resource Allocation Based Packet Scheduling For LTE Uplink", School of Electronics and Information Engineering Harbin Institute of Technology, Harbin, China.
Jinyong et al., "Study on Enhancements of LTE System for Diverse Data Applications", Shenzhen, China, Jul. 1, 2013.
ZTE, "Enhancements on multi-beam operation", 3GPP TSG RAN WG1 Meeting #94bis, R1-1810221, Chengdu, China, Oct. 8-12, 2018.
Motorola Mobility, "PUSCH enhancement for URLLC", 3GPP TSG RAN WG1 Meeting #95, R1-1813354, Spokane, Washington, USA, Nov. 12-16, 2018.
NTT Docomo Inc., "Enhancements on multi-TRP/panel transmission", 3GPP TSG RAN WG1 Meeting #95, R1-1813333, Spokane, USA, Nov. 12-16, 2018.
Huawei, "UCI transmission in NR operations in unlicensed", 3GPP TSG RAN WG1 Meeting #92bis, R1-1803682, Sanya, China, Apr. 16-Apr. 20, 2018.
"3rd Generation Partnership Project; Technical Specification Group Radio Access Network; NR; Physical layer procedures for data (Release 15)", 3GPP TS 38.214 V15.3.0 (Sep. 2018), Valbonne, France.

* cited by examiner

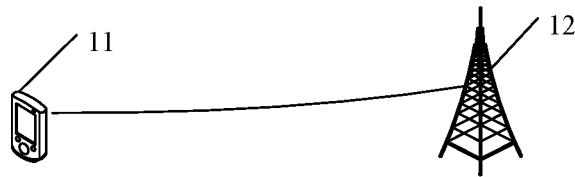

FIG. 1

Send indication information to a terminal, where the indication information is used to indicate an uplink channel related transmission parameter, the transmission parameter corresponds to N uplink channels and/or at least two target transmissions of a target uplink channel, and N is an integer greater than 1 — 201

FIG. 2

| Bit field mapped to index | Codepoint |
|---|---|
| 0 | 1 layer: TPMI = 0 |
| 1 | 1 layer: TPMI = 1 |
| ... | ... |
| 3 | 1 layer: TPMI = 3 |
| 4 | 2 layers: TPMI = 0 |
| ... | ... |
| 9 | 2 layers: TPMI = 5 |
| 10 | 3 layers: TPMI = 0 |
| 11 | 4 layers: TPMI = 0 |
| 12 to 15 | Reserved |

FIG. 3a

| Bit field mapped to index | Codepoint |
|---|---|
| 0 | 1 layer: TPMI = 0 |
| 1 | 1 layer: TPMI = 1 |
| ... | ... |
| 3 | 1 layer: TPMI = 3 |
| 4 | 2 layers: TPMI = 100 |
| ... | ... |
| 9 | 10 layers: TPMI = 5 |
| 10 | 3 layers: TPMI = 0 |
| 11 | 4 layers: TPMI = 0 |
| 12 | Uplink transmission scheme |
| 13 to 15 | Reserved |
| 16 to 31 | New |

FIG. 3b

| Bit field mapped to index | Codepoint |
|---|---|
| 0 | 1 layer: TPMI = 0 |
| 1 | 1 layer: TPMI = 1 |
| ... | ... |
| 3 | 1 layer: TPMI = 3 |
| 4 | Reserved |
| ... | Reserved |
| 9 | Reserved |
| 10 | Reserved |
| 11 | Reserved |
| 12 to 15 | Reserved |

FIG. 3c

Perform transmission of an uplink channel according to an uplink channel related transmission parameter, where the transmission parameter corresponds to N uplink channels and/or at least two target transmissions of a target uplink channel, and N is an integer greater than 1 — 401
FIG. 4
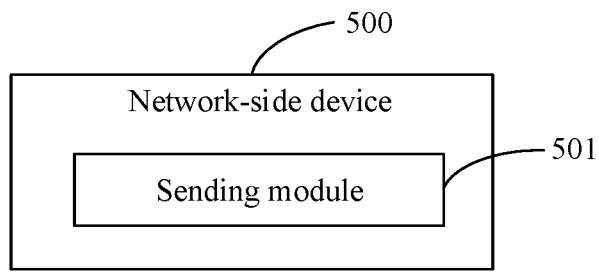
FIG. 5
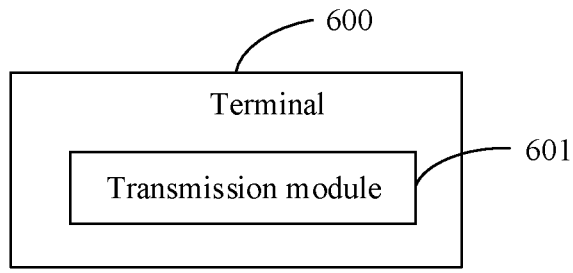
FIG. 6

UPLINK CHANNEL CONFIGURATION METHOD, UPLINK CHANNEL TRANSMISSION METHOD, NETWORK-SIDE DEVICE, AND TERMINAL

CROSS-REFERENCE TO RELATED APPLICATIONS

This application is a continuation application of PCT Application No. PCT/CN2020/070075 filed on Jan. 2, 2020, which claims priority to Chinese Patent Application No. 201910028852.4, filed in China on Jan. 11, 2019, which are incorporated herein by reference in their entireties.

TECHNICAL FIELD

Embodiments of this disclosure relate to the field of communications technologies, and in particular, to an uplink channel configuration method, an uplink channel transmission method, a network-side device, and a terminal.

BACKGROUND

In a related art communications system, there are two types of uplink channels, physical uplink shared channel (PUSCH) and physical uplink control channel (PUCCH). PUCCH mainly carries uplink control information (UCI), for example, hybrid automatic repeat request (HARQ) feedback information, channel quality feedback information, and scheduling request. PUSCH mainly carries uplink service data.

The related art communications system allows a network-side device to configure or indicate a transmission parameter for only one uplink channel. When a terminal needs transmission of a plurality of uplink channels, for example when the terminal is to transmit uplink channels to a plurality of transmission and reception points (TRP), the network-side device is required to signal a plurality of configurations or indications, leading to high signaling overheads.

SUMMARY

Embodiments of this disclosure provide an uplink channel configuration method, an uplink channel transmission method, a network-side device, and a terminal.

According to a first aspect, an embodiment of this disclosure provides an uplink channel configuration method applied to a network-side device, where the method includes:

sending indication information to a terminal, where the indication information is used to indicate an uplink channel related transmission parameter, the transmission parameter corresponds to N uplink channels and/or at least two target transmissions of a target uplink channel, and N is an integer greater than 1.

According to a second aspect, an embodiment of this disclosure provides an information transmission method, applied to a terminal, where the method includes:

performing transmission of an uplink channel according to an uplink channel related transmission parameter, where the transmission parameter corresponds to N uplink channels and/or at least two target transmissions of a target uplink channel, and N is an integer greater than 1.

According to a third aspect, an embodiment of this disclosure further provides a network-side device, and the network-side device includes:

a sending module, configured to send indication information to a terminal, where the indication information is used to indicate an uplink channel related transmission parameter, the transmission parameter corresponds to N uplink channels and/or at least two target transmissions of a target uplink channel, and N is an integer greater than 1.

According to a fourth aspect, an embodiment of this disclosure further provides a terminal, where the terminal includes:

a transmission module, configured to perform transmission of an uplink channel according to an uplink channel related transmission parameter, where the transmission parameter corresponds to N uplink channels and/or at least two target transmissions of a target uplink channel, and N is an integer greater than 1.

According to a fifth aspect, an embodiment of this disclosure further provides a network-side device, where the network-side device includes a processor, a memory, and a computer program stored in the memory and capable of running on the processor. When the computer program is executed by the processor, the steps of the uplink channel configuration method described above are implemented.

According to a sixth aspect, an embodiment of this disclosure further provides a terminal, where the terminal includes a processor, a memory, and a computer program stored in the memory and capable of running on the processor. When the computer program is executed by the processor, the steps of the uplink channel configuration method described above are implemented.

According to a seventh aspect, an embodiment of this disclosure further provides a computer-readable storage medium. The computer-readable storage medium stores a computer program, and when the computer program is executed by a processor, the steps of the uplink channel configuration method described above or the steps of the uplink channel transmission method described above are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and persons of ordinary skill in the art may derive other drawings from these accompanying drawings.

FIG. 1 is a structural diagram of a network system to which an embodiment of this disclosure may be applied;

FIG. 2 is a flowchart of an uplink channel configuration method according to an embodiment of this disclosure;

FIG. 3a is a first schematic diagram of a precoding information and number of layers signaling field according to an embodiment of this disclosure;

FIG. 3b is a second schematic diagram of a precoding information and number of layers signaling field according to an embodiment of this disclosure;

FIG. 3c is a third schematic diagram of a precoding information and number of layers signaling field according to an embodiment of this disclosure;

FIG. 4 is a flowchart of an uplink channel transmission method according to an embodiment of this disclosure;

FIG. 5 is a first structural diagram of a network-side device according to an embodiment of this disclosure;

FIG. 6 is a first structural diagram of a terminal according to an embodiment of this disclosure;

DESCRIPTION OF EMBODIMENTS

Figure 7:
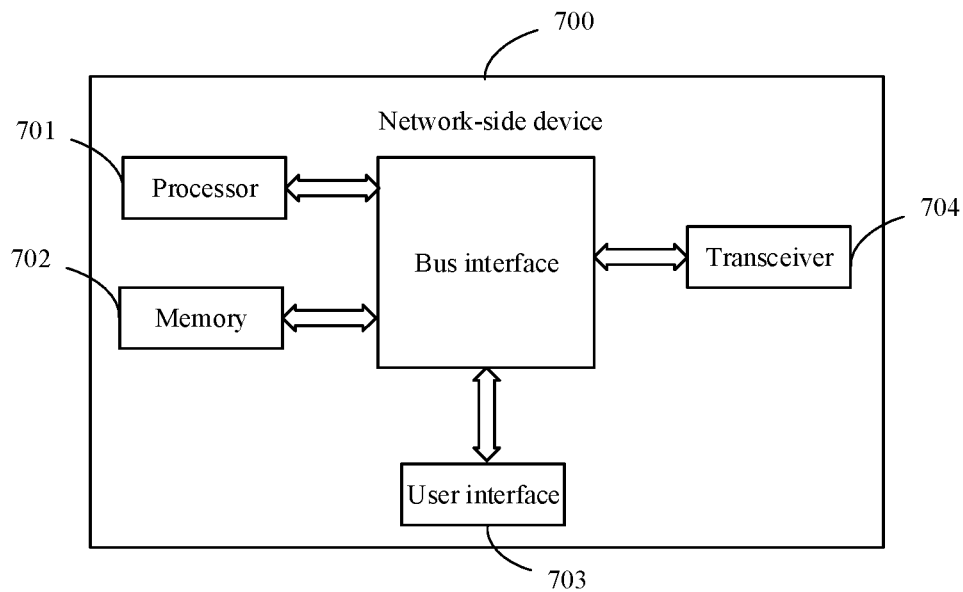
FIG. 7 is a second structural diagram of a network-side device according to an embodiment of this disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by persons of ordinary skill in the art based on the embodiments of this disclosure shall fall within the protection scope of this disclosure.

The terms "first", "second", and the like in this application are used to distinguish between similar objects instead of describing a specific order or sequence. In addition, the terms "include", "have", and any other variants thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. In addition, the use of "and/or" in this application represents presence of at least one of the connected objects. For example, A and/or B and/or C represents the following seven cases: A alone, B alone, C alone, both A and B, both B and C, both A and C, and all of A, B, and C.

FIG. 1 is a structural diagram of a network system to which an embodiment of this disclosure may be applied. As shown in FIG. 1, the network system includes a terminal 11 and a network-side device 12, and communication can be performed between the terminal 11 and the network-side device 12.

In embodiments of this disclosure, the terminal 11 may also be referred to as user equipment (UE). In a specific implementation, the terminal 11 may be a terminal-side device such as a mobile phone, a tablet computer (Tablet Personal Computer), a laptop computer, a personal digital assistant (PDA), a mobile internet device (MID), a wearable device, or an in-vehicle device. It should be noted that the terminal 11 is not limited to a specific type in the embodiments of this disclosure.

The network-side device 12 may be a base station, a TRP, or the like. In the embodiments of this disclosure, the TRP may be defined by at least one of the following: a control resource set (CORESET) or a control resource set group; an explicitly defined TRP; a transmission configuration indication state (TCI State), a transmission configuration indication state list or a transmission configuration indication state pool (TCI State List/Pool); QCL information or QCL group information; spatial relation information or spatial relation group information; a physical downlink shared channel (PDCCH) scrambling identifier or a PDCCH scrambling identifier group (PDCCH Scrambling ID or ID group); a physical downlink shared channel (PDSCH) scrambling identifier or a PDSCH scrambling identifier group (PDSCH Scrambling ID or ID group); a PDCCH-Config information element (PDCCH-Config information element); and a PDSCH-Config information element (PDSCH-Config information element).

For ease of understanding, the following describes some content involved in the embodiments of this disclosure.

1. Multi-Antenna

Standards for radio access technologies such as long term evolution (LTE)/LTE-advanced (LTE-A) are built based on technologies of multiple-input multiple-output (MIMO) and orthogonal frequency division multiplexing (OFDM). The MIMO technology takes advantage of a spatial degree of freedom brought by a multi-antenna system to improve a peak rate and system spectrum efficiency.

The dimensions of MIMO technology continue to expand during the development of standardization. In LTE Rel-8, up to 4 layers of MIMO transmissions can be supported. In Rel-9 enhanced multi-user MIMO (MU-MIMO) technology, transmission mode (TM)-8 MU-MIMO transmission can support up to 4 downlink data layers. In Rel-10, the transmission capability of single-user MIMO (SU-MIMO) is extended to a maximum of 8 data layers.

The industry is further promoting the MIMO technology to be three-dimensional and large-scale. The third generation partnership project (3GPP) is conducting research and standardization works on new radio (NR) MIMO. It can be foreseen that in the future fifth generation (5G) mobile communications system, the massive MIMO technology with more antenna ports will be introduced.

Massive MIMO technology uses a larger quantity of antenna arrays, and can greatly improve band efficiency of the system and support access of a larger quantity of users. Therefore, major research organizations all regard massive MIMO technology as one of the most promising physical layer technologies in the next generation of mobile communication systems.

In the massive MIMO technology, if an all-digital array is used, a maximum spatial resolution and optimal MU-MIMO performance may be achieved, but this structure requires a large number of analog-to-digital (AD)/digital-to-analog (DA) converters and a large number of complete radio frequency-baseband processing channels. As a result, both device costs and baseband processing complexity cause huge burden.

To avoid the aforementioned implementation costs and device complexity, a digital-analog hybrid beamforming technology has been presented, that is, based on related art digital domain beamforming, addition of a further beamforming procedure for a radio frequency signal—analog beamforming (or analog shaping)—at a front end adjacent to an antenna system. The analog beamforming is capable of roughly matching transmit signals with channels in a relatively simple manner. The number of dimensions of the equivalent channel formed after the analog shaping is smaller than the actual number of antennas, so in the subsequent procedures, the number of AD/DA converters, the number of digital channels and the corresponding baseband processing complexity may all be remarkably reduced. The residual interference of the analog shaped portion may be processed again in the digital domain to ensure the quality of MU-MIMO transmission. Compared with full digital shaping, hybrid digital-analog beamforming is a compromise between performance and complexity. It has a high practical prospect in systems with large bandwidth in high frequency bands or large numbers of antennas.

2. High Frequency Bands

In the research of the next generation of communication systems after the fourth-generation (4G) communications technologies, an operating frequency band supported by a system has been raised to above 6 GHz, up to about 100 GHz. A high frequency band has relatively abundant idle frequency resources, and may provide a greater throughput for data transmission. 3GPP is conducting research and standardization works for high frequency bands in NR. A higher frequency signal has a shorter wavelength. Therefore, compared with a low frequency band, in a high frequency band, more antenna array elements can be arranged on a panel of a same size, and beams can be with stronger directivity and narrower lobes using a beamforming technology. Therefore, it is also one of the future trends to combine massive antennas with high-frequency communication.

3. Beam Measurement and Reporting

For analog beamforming technology, analog beams are transmitted at a full bandwidth. In addition, the analog beams can be transmitted only in a time-division multiplexing manner by an array element in each polarization direction on each high-frequency antenna array panel. The shaping weights of analog beams are implemented by adjusting parameters of RF front-end devices such as a phase shifter.

In the related art, a polling manner is usually used for training of analog beamforming vectors, that is, the antenna element of each polarization direction of each antenna panel sends a training signal (that is, a candidate beamforming vector) sequentially at agreed times in a time-division multiplexing manner. A terminal feeds back a beam report after measurement, so that the network side can use the training signal to implement analog beam emission for a next transmission. Content of the beam report usually includes reference signal resource identifiers used for several relatively optimal transmit beams and a measured received power of each transmit beam. For example, the reference signal resource identifier may include a channel state information reference signal resource indicator (CSI-RS Resource Indicator, CRI) or a synchronization signal block resource indicator (SSB Resource Indicator, SSBRI). The received power may include layer 1 reference signal received power (L1-RSRP).

4. PUCCH

The purposes of designing a PUCCH include:
satisfying different block error rate (BLER) targets, and designing different Formats based on content of PUCCH transmissions. The content of a PUCCH transmission may include at least one of the following: an acknowledgement (ACK) or negative acknowledgement (NACK), a scheduling request (SR), and channel state information (CSI);
satisfying different latency requirements. For example, a Short PUCCH allows for fast feedback and shorter latency, and may be one symbol in its shortest form;
satisfying different coverage requirements. A PUCCH is 1 to 14 symbols in length, and can be transmitted repeatedly for multiple times. For example, a Long PUCCH has a relatively large coverage;
satisfying a multi-user multiplexing capability. It is possible to implement transmission without multi-user multiplexing, with multi-user multiplexing, or with strong multi-user multiplexing by carrying a corresponding number of uplink control information (UCI) Bits (number of bits); and
satisfying a relatively low Cubic Metric or a peak to average power ratio (PAPR). A new computer generated sequence (CGS) is introduced for pilot and UCI. Single carrier discrete Fourier transform spread spectrum orthogonal frequency division multiplexing (DFT-S-OFDM) based on discrete Fourier transform (DFT) is used to guarantee coverage, and a multi-carrier transmission design based on cyclic prefix OFDM (CP-OFDM) is used for non coverage-limited PUCCHs.

A network-side device configures PUCCH related information for UE through radio resource control (RRC) signaling. An information element (IE) for configuring UE Specific PUCCH parameters per bandwidth part (BWP) is PUCCH-Config, which includes: PUCCH resource information, PUCCH Format, PDSCH and its ACK/NACK timing information, Spatial Relation information of PUCCH, and the like. An IE for configuring Cell Specific PUCCH parameters is PUCCH-ConfigCommon, which includes: PUCCH resource information, group frequency hopping information, and the like. Furthermore, information related to path loss and power control of a PUCCH is also configured.

Spatial Relation information of a PUCCH characterizes a spatial relation between a Reference RS and the PUCCH, that is, uplink spatial parameter information used for transmitting the PUCCH. The Reference RS may be: an SSB, a CSI reference signal (CSI-RS) or a sounding reference signal (SRS). If a network-side device has configured a plurality of Spatial Relations through RRC signaling, the network-side device also needs to use a medium access control element (MAC CE) Command to select one of them.

5. PUSCH

PUSCH is a channel used to transmit uplink data and signaling. A network-side device configures PUSCH related information through RRC signaling. An IE for configuring UE Specific PUSCH parameters per BWP is PUSCH-Config, which includes: data scrambling information, precoding information, demodulation reference signal (DMRS) information, power control information, frequency hopping information, resource allocation information, modulation and coding scheme (MCS) information, resource block group (RBG) information, and the like. An IE for configuring Cell Specific PUSCH parameters is PUSCH-ConfigCommon, which includes: group frequency hopping information, resource allocation information, and the like. In addition, power control information of the PUSCH is also configured.

For Spatial Relation information of a PUSCH, when DCI carried on a PDCCH schedules the PUSCH, each SRI Codepoint of a sounding reference signal resource indicator field (SRI field) in the DCI indicates one SRI, and the SRI is used to indicate a spatial relation of the PUSCH.

For a Codebook Based PUSCH, the signaling field "Precoding information and number of layers" of the DCI is used to indicate information of a Codebook used for the PUSCH, including, for example, transmitted precoding matrix indicator (TPMI) information, number of layers information (or known as rank indicator (RI) information), and the like. The network-side device determines Codebook information through measuring an SRS transmitted by the UE. The UE may learn the information of the Codebook for transmission of the PUSCH according to the signaling field.

For a Non-codebook Based PUSCH, the signaling field "SRS resource indicator" in the DCI is used to indicate precoding information of the PUSCH, that is, a precoding weight of the PUSCH is the same as that of an SRS resource indicated by the signaling field.

In the embodiments of this disclosure, beam information, Spatial Relation information, Spatial Domain Transmission Filter information, Spatial Filter information, and quasi co-location (QCL) information have the same meaning, all of which refer to beam information.

A related art communications system allows a network-side device to configure or indicate a transmission parameter, for example, precoding information, for only one uplink channel (for example, one PUSCH or one PUCCH).

This disclosure allows a network-side device to configure or indicate a plurality of uplink channels (for example, each channel transmitted to a different TRP), and/or different parts of a target uplink channel (for example, each of repeated transmissions, transmissions before and after frequency hopping in a case of frequency hopping, or different parts of a channel transmitted at different times), for example: precoding information, spatial relation information (beam), and the like.

The following describes the uplink channel configuration method in the embodiments of this disclosure.

FIG. 2 is a flowchart of an uplink channel configuration method according to an embodiment of this disclosure. The uplink channel configuration method shown in FIG. 2 is applied to a network-side device.

As shown in FIG. 2, the uplink channel configuration method in this embodiment of this disclosure may include the following step.

Step 201: Send indication information to a terminal, where the indication information is used to indicate an uplink channel related transmission parameter, the transmission parameter corresponds to N uplink channels and/or at least two target transmissions of a target uplink channel, and N is an integer greater than 1.

In this embodiment of this disclosure, in a case that the transmission parameter corresponds to N uplink channels, the indication information may be used to simultaneously indicate a transmission parameter corresponding to N uplink channels.

Further, in the case that the transmission parameter corresponds to N uplink channels, the N uplink channels correspond to M transmission and reception points TRPs, and M is an integer greater than 1. In practical applications, M may be less than or equal to N, which means that one TRP may correspond to one or more uplink channels.

In a case that the transmission parameter corresponds to at least two target transmissions of a target uplink channel, the indication information may be used to simultaneously indicate a transmission parameter corresponding to at least two target transmissions of a target uplink channel.

It should be noted that in this embodiment of this disclosure, the number of target uplink channels may be equal to or greater than 1. In a case that the number of target uplink channels is greater than 1, that the indication information is used to indicate at least two target transmissions of a target uplink channel can be understood as: the indication information is used to indicate a transmission parameter corresponding to at least two target transmissions of each uplink channel of the target uplink channels. In addition, the number of target transmissions of each uplink channel of the target uplink channels can be equal or unequal.

Further, in the case that the transmission parameter corresponds to at least two target transmissions of a target uplink channel, the target transmission may be represented as: a repeated transmission, a frequency hopping transmission, or a fractional transmission. It should be understood that content transmitted in each fractional transmission may be a different part of target content.

It should be noted that if the transmission parameter corresponds to N uplink channels and at least two target transmissions of a target uplink channel, the target uplink channel may be understood as at least one uplink channel of the N uplink channels.

In this embodiment of this disclosure, the indication information may be transmitted through at least one of RRC layer information, MAC layer information, and physical layer control information, where the RRC layer information includes RRC signaling, the MAC layer information includes a MAC CE, and the physical layer control information includes DCI. During implementation, a type of information carrying the indication information may be specifically determined according to a transmission parameter type of an uplink channel indicated by the indication information.

The transmission information may include, but is not limited to, at least one of the following: an uplink channel transmission scheme, precoding information, spatial relation information, and the number of transmissions information.

In the uplink channel configuration method according to this embodiment, a network-side device may use one piece of indication information to simultaneously indicate a transmission parameter corresponding to N uplink channels, and/or a transmission parameter corresponding to at least two target transmissions of a target uplink channel, thereby reducing signaling overheads.

In this embodiment of this disclosure, the uplink channel may be PUSCH and/or PUCCH. The following describes a scenario where the uplink channel is a PUSCH and a scenario where the uplink channel is a PUCCH, respectively.

Scenario 1: The uplink channel is a PUSCH.

In this scenario, optionally, the indication information is transmitted through downlink control information DCI.

In a first implementation, optionally, the DCI includes a first signaling field, and the first signaling field is used to indicate an uplink transmission scheme for the PUSCH, where the uplink transmission scheme includes at least one of the following: diversity based PUSCH, codebook based PUSCH, and non-codebook based PUSCH.

During implementation, the first signaling field may be a new signaling field in the DCI, or an existing signaling field in the DCI.

Optionally, the first signaling field is a precoding information and number of layers signaling field, and the precoding information and number of layers signaling field uses a first codepoint to indicate the uplink transmission scheme for the PUSCH.

Different from the related art where DCI format 0_0 is used to indicate diversity based uplink transmission, DCI format 0_1 is used to indicate codebook or non-codebook based PUSCH. This implementation may use a first codepoint of the precoding information and number of layers signaling field to indicate: diversity based PUSCH, codebook based PUSCH, and non-codebook based PUSCH. In this way, a terminal does not need to use a plurality of formats in blind detection, thereby reducing overheads.

During implementation, a specific representation form of an uplink transmission scheme for the PUSCH indicated by the first codepoint is determined based on a type of the first codepoint and/or a value of the first codepoint.

Optionally, in a case that the first codepoint is a reserved codepoint, a new codepoint, a codepoint for which a transmitted precoding matrix indicator TPMI is a special value, or a codepoint for which the number of layers is a special value, the uplink transmission scheme for the PUSCH indicated by the first codepoint is: diversity based PUSCH or non-codebook based PUSCH.

It should be understood that a special value of the TPMI is a value different from conventional values of the TPMI. A special value of the number of layers is a value different from conventional values of the number of layers. During specific implementation, the special values may be determined in advance, and a special value indicating diversity based PUSCH is different from a special value indicating a non-codebook based PUSCH, to improve accuracy of a terminal identifying the uplink transmission scheme for the PUSCH.

For ease of understanding, refer to FIG. 3a and FIG. 3b together. FIG. 3a is a representation form of a precoding information and number of layers signaling field in the related art, and FIG. 3b is a representation form of a precoding information and number of layers signaling field according to an embodiment of this disclosure.

The precoding information and number of layers signaling field shown in FIG. 3a consists of 4 bits, including 16 codepoints. Codepoint 0 to codepoint 11 in FIG. 3a are non-reserved codepoints, each including an indicated number of layers and a TPMI value, and the indicated number of layers values and TPMI values of the non-reserved codepoints in FIG. 3a are conventional values. Codepoint 12 to codepoint 15 are reserved codepoints.

The precoding information and number of layers signaling field shown in FIG. 3b is obtained by modifying and extending the precoding information and number of layers signaling field shown in FIG. 3a. Optionally, in the precoding information and number of layers signaling field shown in FIG. 3b: a TPMI value of codepoint 4 is changed from 0 in FIG. 3a to a special value 100, a number of layers value of codepoint 9 is changed from 2 in FIG. 3a to a special value 10, codepoint 12 in FIG. 3a is used to indicate an uplink transmission scheme for the PUSCH, and new codepoints 16 to 31 are added on a basis of FIG. 3a.

The TPMI value of codepoint 4 in FIG. 3b is a special value. Therefore, when the precoding information and number of layers signaling field may use codepoint 4 in FIG. 3b to indicate an uplink transmission scheme for the PUSCH, the codepoint 4 in FIG. 3b may be used to indicate diversity based PUSCH or non-codebook based PUSCH.

The number of layers value of codepoint 9 in FIG. 3b is a special value. Therefore, when the precoding information and number of layers signaling field may use codepoint 9 in FIG. 3b to indicate an uplink transmission scheme for the PUSCH, the codepoint 9 in FIG. 3b may be used to indicate diversity based PUSCH or non-codebook based PUSCH.

The codepoint 12 in FIG. 3b is a reserved codepoint before being used to indicate an uplink transmission scheme for the PUSCH. Therefore, when the precoding information and number of layers signaling field may use codepoint 12 in FIG. 3b to indicate an uplink transmission scheme for the PUSCH, the codepoint 12 in FIG. 3b may be used to indicate diversity based PUSCH or non-codebook based PUSCH.

Codepoints 16 to 31 are new codepoints in FIG. 3b. Therefore, the precoding information and number of layers signaling field may use any one of the codepoints 16 to 31 to indicate diversity based PUSCH or non-codebook based PUSCH.

It should be noted that for a reserved codepoint indicating diversity based PUSCH or non-codebook based PUSCH, the codepoint may be a reserved codepoint inherent in the precoding information and number of layers signaling field, for example, codepoint 12 shown in FIG. 3b.

However, in practical applications, the reserved codepoint may be understood as a reserved codepoint changed from a non-reserved codepoint in the precoding information and number of layers signaling field.

For ease of understanding, reference is made to FIG. 3c. FIG. 3c is another representation form of a precoding information and number of layers signaling field according to an embodiment of this disclosure.

The precoding information and number of layers signaling field shown in FIG. 3c is obtained by modifying the precoding information and number of layers signaling field shown in FIG. 3a. Optionally, in the precoding information and number of layers signaling field shown in FIG. 3c: codepoints indicating layers other than 1 layer, that is codepoint 4 to codepoint 11, are changed to reserved codepoints. In this way, a terminal may use a changed-to-reserved codepoint to indicate diversity based PUSCH or non-codebook based PUSCH.

For implementation principles of changing a non-reserved codepoint in a precoding information and number of layers signaling field to a reserved codepoint, specific descriptions are as follows.

In this embodiment of this disclosure, the number of layers of a PUSCH may be fixed to 1. Because the number of layers of a PUSCH is fixed to 1, compared with a precoding information and number of layers signaling field in a scenario where the number of layers of a PUSCH is greater than 1, the number of layers content required to be indicated in the precoding information and number of layers signaling field of this embodiment of this disclosure is reduced. In this way, in this embodiment of this disclosure, codepoints used to indicate content of layers other than 1 layer in the precoding information and number of layers signaling field in the scenario where the number of layers of a PUSCH is greater than 1 may be changed to reserved codepoints, for indicating other types of transmission parameters, for example: for indicating an uplink transmission scheme, precoding information, or beam information of an uplink channel. In other words, in this embodiment of this disclosure, by fixing the number of layers of a PUSCH to 1, the precoding information and number of layers signaling field may use same number of bits to indicate more transmission parameter types.

Certainly, in this embodiment of this disclosure, the number of bits of the precoding information and number of layers signaling field may also be reduced by fixing the number of layers of a PUSCH to 1, so as to use the number of bits saved from the precoding information and number of layers signaling field to form new signaling fields for indicating other types of transmission parameters.

For example, it is assumed that for a PUSCH with 4 layers, the precoding information and number of layers signaling field needs to use 6 bits to indicate a transmission parameter, while for a PUSCH with 1 layer, the precoding information and number of layers signaling field needs to use only 2 bits to indicate a transmission parameter. Then a network-side device may reduce the number of bits of the precoding information and number of layers signaling field to 2, and use 4 bits saved to form a new indication field.

In addition, in this embodiment of this disclosure, by fixing the number of layers of a PUSCH to 1, inter-layer interference can also be reduced, thereby improving transmission performance.

In a second implementation, optionally, the DCI includes a second signaling field, and the second signaling field is used to indicate precoding information of PUSCH.

Optionally, in a case that the precoding information corresponds to N codebook based PUSCHs, the second signaling field is a precoding information and number of layers signaling field; and the DCI uses one precoding information and number of layers signaling field to indicate precoding information of the N codebook based PUSCHs; or the DCI uses N precoding information and number of layers signaling fields to indicate precoding information of the N codebook based PUSCHs.

For the implementation that the DCI uses N precoding information and number of layers signaling fields to indicate precoding information of the N codebook based PUSCHs, it should be understood that the DCI uses one precoding information and number of layers signaling field to indicate precoding information of one codebook based PUSCH.

In addition, the DCI may also determine the number of precoding information and number of layers signaling fields included in the DCI based on the number of TRPs corresponding to the N codebook based PUSCHs.

For example, if the N codebook based PUSCHs correspond to M TRPs, the DCI may use M precoding information and number of layers signaling fields to indicate precoding information of the N codebook based PUSCHs, where each precoding information and number of layers signaling field may be used to indicate precoding information of codebook based PUSCH(s) corresponding to one TRP.

It should be noted that, in this embodiment of this disclosure, for a codebook based PUSCH, its precoding information can be understood as codebook information.

Optionally, in a case that the precoding information corresponds to a diversity based PUSCH, the second signaling field is a precoding information and number of layers signaling field, and the precoding information and number of layers signaling field uses a reserved codepoint to indicate precoding information of the diversity based PUSCH.

The reserved codepoint may be understood as a reserved codepoint changed from a non-reserved codepoint in the precoding information and number of layers signaling field. Reference may be made to the related description in the first implementation, and details are not described herein again.

It should be noted that in the case that the precoding information corresponds to a diversity based PUSCH, the second signaling field may be a new signaling field. In addition, in practical applications, the precoding information of a diversity based PUSCH may be predefined.

During specific implementation, when transmitting a diversity based PUSCH, a terminal may determine precoding information of the diversity based PUSCH by using Cycling Precoding. For example, if the precoding information of a diversity based PUSCH predefined or indicated in the second indication field is precoding information 1 and precoding information 2, then when transmitting the diversity based PUSCH for the first time, the terminal may use the precoding information 1 for transmission; when transmitting the diversity based PUSCH for the second time, the terminal may use the precoding information 2 for transmission; when transmitting the diversity based PUSCH for the third time, the terminal may use the precoding information 1 for transmission; and when transmitting the diversity based PUSCH for the fourth time, the terminal may use the precoding information 2 for transmission, and so on.

In this implementation, further, in a case that the precoding information corresponds to at least two target transmissions of a target PUSCH, the DCI further includes a third signaling field, and the third signaling field is used to indicate the number of target transmissions of the target PUSCH.

In practical applications, the third signaling field may explicitly or implicitly indicate the number of target transmissions.

Optionally, for a third signaling field explicitly indicating the number of target transmissions, the third signaling field may include a specific number P of target transmissions.

For a third signaling field implicitly indicating the number of target transmissions, the third signaling field includes no specific number P of target transmissions, but may include other information that may be used to indicate the number of target transmissions. For example, if a target transmission is a frequency hopping transmission, the third signaling field may indicate the number of frequency hopping transmissions by carrying physical resource blocks (PRB) corresponding to each frequency hopping transmission. For example, if the terminal detects that 3 PRBs before and after frequency hopping are indicated in the third signaling field, the number of frequency hopping transmissions may be determined to be 3.

In this implementation, the second signaling field may be a new signaling field. Certainly, the second signaling field may also be a signaling field in the related art. Optionally, in a case that the precoding information corresponds to at least two target transmissions of a codebook based target PUSCH, or in a case that the precoding information corresponds to at least two target transmissions of a non-codebook based target PUSCH, the second signaling field is a sounding reference signal resource indicator SRI signaling field. During specific implementation, the precoding information and number of layers signaling field as well as the SRI signaling field may use bits or codepoints saved by fixing the number of layers to 1 to indicate the precoding information of PUSCH.

In this implementation, the second signaling field may indicate precoding information of each of at least two target transmissions of the target uplink channel. The second signaling field may alternatively indicate only precoding information of each of S target transmissions included in at least two transmissions of a target uplink channel.

For the scenario in which the second signaling field indicates only precoding information of each of S target transmissions included in at least two transmissions of a target uplink channel, specific descriptions are as follows.

In an implementation, a terminal may use precoding information of each target transmission of S target transmissions in cycle based on a preset mode, to perform at least two target transmissions of a target uplink channel. The preset mode may be pre-configured by the network-side device using higher-layer signaling, or predefined in a protocol, and then the pre-configured preset mode may be indicated by a second signaling field. For example, if the number of transmissions of a target uplink channel is 4, the second signaling field indicates that precoding information of a first-time transmission of the target uplink channel is precoding information 1, and indicates that precoding information of a second-time transmission of the target uplink channel is precoding information 2. Then, when performing 4 target transmissions of the target uplink channels, the terminal may use the precoding information in the following order: precoding information 1, precoding information 2, precoding information 1, and precoding information 2; or precoding information 1, precoding information 2, precoding information 2, precoding information 1. In another implementation, a terminal may obtain precoding information of each of at least two target transmissions of a target uplink channel by changing precoding information of each of S target transmissions of the target uplink channel indicated in the second signaling field, and then use the obtained precoding information of each of the at least two target transmissions to perform at least two target transmissions.

Scenario 2: The uplink channel is a PUCCH.

In this scenario, optionally, the indication information is transmitted through at least one of radio resource control RRC layer information, medium access control MAC layer information, and physical layer control information, where the RRC layer information includes RRC signaling; the MAC layer information includes a MAC control element CE; and the physical layer control information includes DCI.

Optionally, in a case that the transmission parameter corresponds to N PUCCHs, the indication information includes a first sub indication information, the first sub indication information is used to indicate Q pieces of spatial relation information, and Q is an integer greater than or equal to N.

Optionally, the first sub indication information may be used to indicate Q pieces of spatial relation information of PUCCHs on a low frequency range (FR) 1.

In practical applications, the first sub indication information may be transmitted through RRC signaling.

In a case that Q is equal to N, in one implementation, the indication information may further include second sub indication information, and the second sub indication information is used to indicate spatial relation information of each PUCCH of the N PUCCHs. In another implementation, the Q pieces of spatial relation information may be used as spatial relation information of the PUCCHs respectively according to a preset order, and in this case no second sub indication information is needed, so that signaling overheads may be reduced.

Further, in a case that Q is greater than N, the indication information further includes second sub indication information, and the second sub indication information is used to indicate spatial relation information of each PUCCH of the N PUCCHs.

In practical applications, the second sub indication information may be a MAC CE. The second sub indication information is used to select spatial relation information for each PUCCH of the N PUCCHs.

Further, the first sub indication information includes G groups of spatial relation information, and the spatial relation information of the G groups of spatial relation information constitutes the Q pieces of spatial relation information, where G is equal to 1; or, G is equal to N; or, a value of G is equal to the number of groups that the N PUCCHs are divided to.

For a scenario in which G is equal to 1, one group of spatial relation information includes Q pieces of spatial relation information. Therefore, the indication information may include second sub indication information used to select spatial relation information for each PUCCH of the N PUCCHs. Alternatively, the Q pieces of spatial relation information are used as spatial relation information of the PUCCHs respectively according to a preset order, and in this case no second sub indication information is needed.

For a scenario in which G is equal to N, the network-side device configures a group of spatial relation information for each PUCCH of the N PUCCHs. If the number of pieces of spatial relation information included in a group of spatial relation information corresponding to a PUCCH is greater than 1, the network-side device may further send second sub indication information, in order that a piece of spatial relation information for the PUCCH can be selected from its corresponding group of spatial relation information.

For a scenario in which G is equal to the number of groups that the N PUCCHs are divided to, it should be understood that for each group of spatial relation information in the G groups, the number of pieces of spatial relation information included therein is greater than or equal to the number of PUCCHs included in a PUCCH group corresponding to the group of spatial relation information. If the number of pieces of spatial relation information corresponding to a group of PUCCHs is greater than the number of PUCCHs, the network-side device may send a second sub indication information, in order that spatial relation information for each PUCCH of the groups of PUCCHs can be selected from a group of spatial relation information corresponding to the group of PUCCHs. In this embodiment of this disclosure, a principle for grouping N PUCCHs is not limited in this disclosure. For example, the principle for grouping N PUCCHs may be, without limitation: PUCCHs corresponding to a same TRP are divided into one group.

Scenario 3: The uplink channel is a PUCCH or PUSCH.

In this scenario, optionally, in a case that the transmission parameter corresponds to at least two target transmissions of a target uplink channel, the indication information includes third sub indication information, and the third sub indication information is used to indicate spatial relation information of at least two target transmissions of the target uplink channel, where the number of pieces of spatial relation information is equal to or not equal to the number of target transmissions of the target uplink channel.

It should be noted that the number of pieces of spatial relation information is equal to the number of target uplink channels, which means each uplink channel of the target uplink channels corresponds to one piece of spatial relation information.

In practical applications, the third sub indication information in this scenario may be transmitted through DCI. Optionally, the indication information may be used to indicate spatial relation information of at least two target transmissions of the target uplink channel on a high frequency FR2.

For a scenario in which the number of pieces of spatial relation information is equal to P, the third sub indication information may be used to indicate spatial relation information of each of at least two target transmissions of the target uplink channel.

For a scenario in which the number of pieces of spatial relation information is less than the number of target transmissions of the target uplink channel, the terminal may use the spatial relation information in cycle. Optionally, when the terminal performs at least two target transmissions of the target uplink channel, J target transmissions of the at least two target transmissions of the target uplink channel may be performed by reusing first spatial relation information in the spatial relation information for transmission. In other words, the terminal may use the first spatial relation information repeatedly for J times in cycle. It should be understood that J is greater than 1, and less than or equal to the number of target transmissions of the target uplink channel.

It should be noted that the number of pieces of first spatial relation information may be equal to or greater than 1. In a case that the number of pieces of first spatial relation information is greater than 1, the number of target transmissions corresponding to each piece of first spatial relation information may be equal or unequal.

Further, the J target transmissions are any one of the following transmissions: an odd number of target transmissions of at least two target transmissions of the target uplink channel; an even number of target transmissions of at least two target transmissions of the target uplink channel; first J target transmissions of at least two target transmissions of the target uplink channel; and last J target transmissions of at least two target transmissions of the target uplink channel. However, it should be understood that this disclosure does not limit the selection mode of how to select J target transmissions from at least two target transmissions.

In practical applications, the terminal may also use the spatial relation information in cycle according to transmission order when performing at least two target transmissions of the target uplink channel. Optionally, being in cycle may refer to being in sequential cycle or reverse cycle. For example, it is assumed that the terminal needs to perform 6 target transmissions of the target uplink channel. However, the third sub indication information only indicates 3 pieces of spatial relation information of the target uplink channel, which are: spatial relation information a, spatial relation information b, and spatial relation information c. For sequential cycle, the spatial relation information used by the terminal in successively performing 6 target transmissions of the target uplink channel may be: spatial relation information a, spatial relation information b, spatial relation information c, spatial relation information a, spatial relation information b, and spatial relation information c. For a reverse cycle, the spatial relation information used by the terminal in successively performing 6 target transmissions may be: spatial relation information a, spatial relation information b, spatial relation information c, spatial relation information c, spatial relation information b, and spatial relation information a.

For a scenario in which the number of pieces of spatial relation information is greater than the number of target transmissions of the target uplink channel, the terminal may select spatial relation information for each of at least two target transmissions of the target uplink channel from the spatial relation information. Optionally, in performing at least two target transmissions of the target uplink channel, the terminal may perform the at least two target transmissions of the target uplink channel by using second spatial relation information in the spatial relation information. It should be noted that the number of pieces of second spatial relation information is equal to the number of target transmissions of the target uplink channel.

Further, the second spatial relation information is: first p pieces of spatial relation information in the spatial relation information that is arranged in order; or, the second spatial relation information is: p pieces of spatial relation information with the smallest spatial distances to target spatial relation information in the spatial relation information; where the target spatial relation information is spatial relation information used in historical transmission of an uplink channel corresponding to at least two target transmissions of the target uplink channel; and P is the number of target transmissions of the target uplink channel. However, it should be understood that this disclosure does not limit the selection mode of who to select second spatial relation information from the spatial relation information.

It should be noted that various optional implementations described in the embodiments of this disclosure may be implemented in combination or may be implemented separately, which is not limited in the embodiments of this disclosure.

FIG. 4 is a flowchart of an uplink channel transmission method according to an embodiment of this disclosure. The uplink channel transmission method shown in FIG. 4 may be applied to a terminal.

As shown in FIG. 4, the uplink channel transmission method in this embodiment of this disclosure may include the following step.

Step 401: Perform transmission of an uplink channel according to an uplink channel related transmission parameter, where the transmission parameter corresponds to N uplink channels and/or at least two target transmissions of a target uplink channel, and N is an integer greater than 1.

During implementation, the uplink channel related transmission parameter may be predefined and/or configured by a network-side device.

Optionally, the transmission parameter includes a predefined number of layers of an uplink channel, and the number of layers is 1.

At least the following beneficial effects may be achieved by fixing the number of layers of an uplink channel to 1: inter-layer interference may be reduced, thereby improving transmission performance; and furthermore, the number of bits for indicating the number of layers information may be reduced, so that saved bits may be used to indicate other types of transmission parameters.

Optionally, in a case that the transmission parameter corresponds to at least two target transmissions of a target uplink channel, the transmission parameter includes: a predefined first association between the number of target transmissions of a target uplink channel and precoding information, and/or a predefined second association between the number of target transmissions of a target uplink channel and spatial relation information.

In this way, when the terminal performs each of the at least two transmissions of the target uplink channel, the terminal may determine precoding information and/or spatial relation information for each transmission without indication from the network side device, thereby reducing signaling overheads.

Optionally, before the performing transmission of an uplink channel according to an uplink channel related transmission parameter, the method further includes:

receiving indication information sent by a network-side device, where the indication information is used to indicate the uplink channel related transmission parameter.

In this implementation, the transmission information of the uplink channel is configured by the network-side device.

Optionally:
in a case that the transmission parameter corresponds to N uplink channels, the N uplink channels correspond to M transmission and reception points TRPs, and M is an integer greater than 1; or
in a case that the transmission parameter corresponds to at least two target transmissions of a target uplink channel, the target transmission is: a repeated transmission, a frequency hopping transmission, or a fractional transmission.

Optionally, the TRP is defined by at least one of the following: a control resource set or a control resource set group; an explicitly defined TRP; a transmission configuration indication state, a transmission configuration indication state list or a transmission configuration indication state pool; QCL information or QCL group information; spatial relation information or spatial relation group information; a physical downlink control channel PDCCH scrambling identifier or a PDCCH scrambling identifier group; a physical downlink shared channel PDSCH scrambling identifier or a PDSCH scrambling identifier group; a PDCCH-Config information element; and a PDSCH-Config information element.

Optionally, in a case that the uplink channel is a physical uplink shared channel PUSCH, the indication information is transmitted through downlink control information DCI.

Optionally, the DCI includes a first signaling field, and the first signaling field is used to indicate an uplink transmission scheme for the PUSCH, where
the uplink transmission scheme includes at least one of the following: diversity based PUSCH, codebook based PUSCH, and non-codebook based PUSCH.

Optionally, the first signaling field is a precoding information and number of layers signaling field, and the precoding information and number of layers signaling field uses a first codepoint to indicate the uplink transmission scheme for the PUSCH.

Optionally, in a case that the first codepoint is a reserved codepoint, a new codepoint, a codepoint for which a transmitted precoding matrix indicator TPMI is a special value, or a codepoint for which the number of layers is a special value, the uplink transmission scheme for the PUSCH indicated by the first codepoint is: diversity based PUSCH or non-codebook based PUSCH.

Optionally, the DCI includes a second signaling field, and the second signaling field is used to indicate precoding information of the PUSCH.

Optionally, in a case that the precoding information corresponds to N codebook based PUSCHs, the second signaling field is a precoding information and number of layers signaling field; and the DCI uses one precoding information and number of layers signaling field to indicate precoding information of the N codebook based PUSCHs; or the DCI uses N precoding information and number of layers signaling fields to indicate precoding information of the N codebook based PUSCHs.

Optionally, in a case that the precoding information corresponds to a diversity based PUSCH, the second signaling field is a precoding information and number of layers signaling field, and the precoding information and number of layers signaling field uses a reserved codepoint to indicate precoding information of the diversity based PUSCH.

Optionally, in a case that the precoding information corresponds to at least two target transmissions of a target PUSCH, the DCI further includes a third signaling field, and the third signaling field is used to indicate the number of target transmissions of the target PUSCH.

Optionally, in a case that the precoding information corresponds to at least two target transmissions of a codebook based target PUSCH, the second signaling field is a precoding information and number of layers signaling field; or in a case that the precoding information corresponds to at least two target transmissions of a non-codebook based target PUSCH, the second signaling field is a sounding reference signal resource indicator SRI signaling field.

Optionally, the uplink channel is a physical uplink control channel PUCCH, and the indication information is transmitted through at least one of radio resource control RRC layer information, medium access control MAC layer information, and physical layer control information, where the RRC layer information includes RRC signaling; the MAC layer information includes a MAC control element CE; and the physical layer control information includes DCI.

Optionally, in a case that the transmission parameter corresponds to N PUCCHs, the indication information includes a first sub indication information, the first sub indication information is used to indicate Q pieces of spatial relation information, and Q is an integer greater than or equal to N.

Optionally, the first sub indication information includes G groups of spatial relation information, and the spatial relation information of the G groups of spatial relation information constitutes the Q pieces of spatial relation information, where G is equal to 1; or, G is equal to N; or, a value of G is equal to the number of groups that the N PUCCHs are divided to.

Optionally, in a case that Q is greater than N, the indication information further includes second sub indication information, and the second sub indication information is used to indicate spatial relation information of each PUCCH of the N PUCCHs.

Optionally, in a case that the transmission parameter corresponds to at least two target transmissions of a target uplink channel, the indication information includes third sub indication information, and the third sub indication information is used to indicate spatial relation information of at least two target transmissions of the target uplink channel, where the number of pieces of spatial relation information is equal to or not equal to the number of target transmissions of the target uplink channel.

Optionally, in a case that the number of pieces of spatial relation information is less than the number of target transmissions of the target uplink channel, the performing transmission of an uplink channel according to an uplink channel related transmission parameter includes: performing J target transmissions of at least two target transmissions of the target uplink channel by reusing first spatial relation information in the spatial relation information.

Optionally, the J target transmissions are any one of the following transmissions:

an odd number of target transmissions of at least two target transmissions of the target uplink channel;

an even number of target transmissions of at least two target transmissions of the target uplink channel;

first J target transmissions of at least two target transmissions of the target uplink channel; and last J target transmissions of at least two target transmissions of the target uplink channel.

Optionally, in a case that the number of pieces of spatial relation information is less than the number of target transmissions of the target uplink channel, the performing transmission of an uplink channel according to an uplink channel related transmission parameter includes: performing at least two target transmissions of the target uplink channel by using second spatial relation information in the spatial relation information, the number of pieces of second spatial relation information being equal to the number of target transmissions of the target uplink channel.

Optionally, the second spatial relation information is: first p pieces of spatial relation information in the spatial relation information that is arranged in order; or the second spatial relation information is: p pieces of spatial relation information with the smallest spatial distances to target spatial relation information in the spatial relation information;

where the target spatial relation information is spatial relation information used in historical transmission of an uplink channel corresponding to at least two target transmissions of the target uplink channel; and P is the number of target transmissions of the target uplink channel.

It should be noted that this embodiment serves as an implementation of the terminal corresponding to the foregoing method embodiment in FIG. 2. Therefore, reference can be made to the related description in the foregoing method embodiment, and the same beneficial effects can be achieved. To avoid repetition, details are not described again herein.

In addition, various optional implementations described in this embodiment of this disclosure may be implemented in combination or may be implemented separately, which is not limited in this embodiment of this disclosure.

In the uplink channel transmission method according to this embodiment, a terminal may perform transmission of an uplink channel according to a transmission parameter corresponding to N uplink channels, and/or a transmission parameter corresponding to at least two target transmissions of a target uplink channel, thereby improving transmission performance.

The main ideas and specific processes in this disclosure are as follows.

(1) For codebook based PUSCH:
 (a) The signaling field "Precoding information and number of layers" in DCI is modified or extended.
  i. For PUSCH(s) that UE transmits to each TRP, one signaling field "Precoding information and number of layers" is used in DCI for each TRP.
  ii. For a PUSCH that UE transmits to a plurality of TRPs, one common signaling field "Precoding information and number of layers" is used in the DCI, and when the DCI uses this signaling field to indicate codebook information of the PUSCH, a signaling value of the signaling field indicates that the UE transmits codebook information of the PUSCH to a plurality of TRPs simultaneously.
 (b) The number of layers of a PUSCH is fixed to 1.
 (c) DCI is used to dynamically indicate switching between diversity based PUSCH and codebook based PUSCH.
  i. In the related art, DCI format 0_0 is used to indicate diversity based uplink transmission, and DCI format 0_1 is used to indicate codebook based PUSCH or non-codebook based PUSCH.
  ii. For a signaling design that dynamically indicates the above-described switching function in the DCI:
   1. A new signaling bit is used.
   2. Alternatively, a codepoint or bit that is saved by fixing the number of layers to 1 in b and unused in the signaling field "Precoding information and number of layers" is used.
   3. Alternatively, a special value of a TPMI corresponding to one codepoint is used in the signaling field "Precoding information and number of layers" to indicate diversity based uplink transmission.
  iii. When using uplink transmit diversity is indicated, the precoding information used may be any one of the following:
   1. Predefined precoding information is used.
   2. A new bit in the DCI or a codepoint or bit that is unused in the signaling field "Precoding information and number of layers" in the above b is used.
 (d) DCI is used to indicate information of repeated transmission of uplink data.
  i. In the related art, an RRC parameter "Pusch-Aggregation Factor" is used to indicate the number of uplink data repetitions.
  ii. For a signaling design that indicates the number of repeated transmissions in the uplink in the DCI:
   1. A new signaling bit is used.
   2. Alternatively, a codepoint or bit that is saved by fixing the number of layers to 1 in b and unused in the signaling field "Precoding information and number of layers" is used.
  iii. Further, for each repeated transmission, different uplink beam information (Spatial Relation information) may be used, and DCI may be used to indicate the Spatial Relation information used for each PUSCH transmission.
 (e) DCI is used to indicate precoding information of each repeated transmission, and/or indicate precoding information after each frequency hopping in frequency hopping transmission.
  i. Precoding information may be mapped to or associated with each repeated transmission and/or frequency hopping transmission.
  ii. For a signaling design of the precoding information:
   1. A new signaling field is used for indication;
   2. Alternatively, a new signaling value in the above described signaling field "Precoding information and number of layers" is used.

(2) For non-codebook based PUSCH
 (a) The number of layers of a PUSCH is fixed to 1 (which may possibly not reduce signaling overheads).
 (b) DCI is used to dynamically indicate information of repeated transmission and/or frequency hopping transmission of uplink data.
  i. DCI indicates precoding information of each repeated transmission and/or frequency hopping transmission of the PUSCH.
   1. Each repeated transmission and/or frequency hopping transmission may be associated with or mapped to a signaling value of the signaling field "SRS resource indicator".
  ii. In a case that UE transmits a PUSCH to a plurality of TRPs, DCI is used to indicate precoding information of each repeated transmission and/or frequency hopping transmission of the PUSCH from the UE to each TRP.
   1. A TRP to which the UE transmits the PUSCH, and each repeated transmission or frequency hopping transmission may be associated with or mapped to a signaling value of the signaling field "SRS resource indicator".

(3) For PUCCH transmission
 (a) The network uses RRC signaling to configure a plurality of groups of spatial relation information for the PUCCH, with each group corresponding to one TRP.
  i. When the number of pieces of spatial relation information within a group is greater than 1, the network uses a MAC CE to select one piece for each TRP.
 (b) The network uses RRC signaling to configure a plurality of groups of spatial relation information for the PUCCH, with each group corresponding to one group of TRPs.
  ii. The network uses a MAC CE to select, for each TRP in each group of TRPs, one piece from its corresponding spatial relation information.
 (c) The network uses RRC signaling to configure spatial relation information of the PUCCH, and then uses a MAC CE to select spatial relation information of the PUCCH for each TRP.
 (d) The above described a to c may be used for PUCCH transmission on FR1.

(4) For PUSCH and PUCCH beams
 (a) Beam related information may be used only for PUSCH and PUCCH transmission on FR2.

(b) When the number of repeated transmissions configured or indicated by the network is the same as the number of pieces of spatial relation information:
   i. An association or mapping relation between each transmission and spatial relation information is predefined. Then, the network indicates the above pattern, that is spatial relation information used for each transmission.
   ii. Alternatively, the signaling field used to indicate spatial relation information is extended to indicate the spatial relation information used for each transmission.
   iii. The above indications may be done in DCI.
(c) When the number of repeated transmissions configured or indicated by the network is different from the number of pieces of spatial relation information:
   i. In a case that the former is smaller than the latter, a number of pieces of spatial relation information that equals the number of repeated transmissions may be taken, for example, taken according to a preset rule.
   ii. In a case that the former is greater than the latter, same spatial relation information may be used for a plurality of repeated transmissions. For example, the spatial relation information is reused in cycle.

Main Innovation and Protection Points of this Disclosure

For codebook based PUSCH:

the signaling field "Precoding information and number of layers" is modified or extended to indicate precoding information of a PUSCH transmitted to a plurality of TRPs;

the number of layers is fixed to 1;

DCI is used to dynamically indicate switching between diversity based PUSCH and codebook based PUSCH;

DCI is used to indicate information of repeated transmission of uplink data;

DCI is used to indicate precoding information of each repeated transmission, and/or indicate precoding information after each frequency hopping in frequency hopping transmission; and DCI is used to indicate spatial relation information of each repeated transmission, and/or indicate spatial relation information after each frequency hopping in frequency hopping transmission.

For Non-Codebook Based PUSCH:

the number of layers is fixed to 1;

DCI is used to indicate precoding information and/or spatial relation information of each repeated transmission and/or frequency hopping transmission of the PUSCH; and DCI is used to indicate precoding information and/or spatial relation information of each repeated transmission and/or frequency hopping transmission of the PUSCH from the UE to each TRP.

For PUCCH Transmission on FR1:

the network uses RRC+MAC CE to indicate Spatial Relation information of the PUCCH transmitted to each TRP.

For PUSCH and PUCCH on FR2:

when the number of repeated transmissions configured or indicated by the network is the same as the number of pieces of spatial relation information, an association or mapping relation between each transmission and spatial relation information is predefined.

when the number of repeated transmissions configured or indicated by the network is different from the number of pieces of spatial relation information, a number of pieces of spatial relation information that equals the number of repeated transmissions is taken, or same spatial relation information is used for a plurality of repeated transmissions.

The effect and benefits of this disclosure are as follows: this disclosure proposes to design a new indication and transmission method in a scenario where the UE is connected to a plurality of TRPs, to support transmission of PUSCH and PUCCH between the UE and the plurality of TRPs. In fact, this disclosure not only supports the multi-TRP scenario, but in a broad sense, may be used for the UE to transmit a plurality of PUSCHs/PUCCHs or different parts of a channel, that is, a plurality of target transmissions of a channel. In terms of service type, this disclosure is suitable for a variety of services such as ultra-reliable and low latency communications (URLLC).

FIG. 5 is a first structural diagram of a network-side device according to an embodiment of this disclosure. As shown in FIG. 5, the network-side device 500 includes:
   a sending module 501, configured to send indication information to a terminal, where the indication information is used to indicate an uplink channel related transmission parameter, the transmission parameter corresponds to N uplink channels and/or at least two target transmissions of a target uplink channel, and N is an integer greater than 1.

Optionally,
   in a case that the transmission parameter corresponds to N uplink channels, the N uplink channels correspond to M transmission and reception points TRPs, and M is an integer greater than 1; or
   in a case that the transmission parameter corresponds to at least two target transmissions of a target uplink channel, the target transmission is: a repeated transmission, a frequency hopping transmission, or a fractional transmission.

Optionally, the TRP is defined by at least one of the following: a control resource set or a control resource set group; an explicitly defined TRP; a transmission configuration indication state, a transmission configuration indication state list or a transmission configuration indication state pool; QCL information or QCL group information; spatial relation information or spatial relation group information; a physical downlink control channel PDCCH scrambling identifier or a PDCCH scrambling identifier group; a physical downlink shared channel PDSCH scrambling identifier or a PDSCH scrambling identifier group; a PDCCH-Config information element; and a PDSCH-Config information element.

Optionally, in a case that the uplink channel is a physical uplink shared channel PUSCH, the indication information is transmitted through downlink control information DCI.

Optionally, the DCI includes a first signaling field, and the first signaling field is used to indicate an uplink transmission scheme for the PUSCH, where
   the uplink transmission scheme includes at least one of the following: diversity based PUSCH, codebook based PUSCH, and non-codebook based PUSCH.

Optionally, the first signaling field is a precoding information and number of layers signaling field, and the precoding information and number of layers signaling field uses a first codepoint to indicate the uplink transmission scheme for the PUSCH.

Optionally, in a case that the first codepoint is a reserved codepoint, a new codepoint, a codepoint for which a transmitted precoding matrix indicator TPMI is a special value, or a codepoint for which the number of layers is a special value, the uplink transmission scheme for the PUSCH indicated by the first codepoint is: diversity based PUSCH or non-codebook based PUSCH.

Optionally, the DCI includes a second signaling field, and the second signaling field is used to indicate precoding information of the PUSCH.

Optionally, in a case that the precoding information corresponds to N codebook based PUSCHs, the second signaling field is a precoding information and number of layers signaling field; and
   the DCI uses one precoding information and number of layers signaling field to indicate precoding information of the N codebook based PUSCHs; or
   the DCI uses N precoding information and number of layers signaling fields to indicate precoding information of the N codebook based PUSCHs.

Optionally, in a case that the precoding information corresponds to a diversity based PUSCH, the second signaling field is a precoding information and number of layers signaling field, and the precoding information and number of layers signaling field uses a reserved codepoint to indicate precoding information of the diversity based PUSCH.

Optionally, in a case that the precoding information corresponds to at least two target transmissions of a target PUSCH, the DCI further includes a third signaling field, and the third signaling field is used to indicate the number of target transmissions of the target PUSCH.

Optionally,
   in a case that the precoding information corresponds to at least two target transmissions of a codebook based target PUSCH, the second signaling field is a precoding information and number of layers signaling field; or
   in a case that the precoding information corresponds to at least two target transmissions of a non-codebook based target PUSCH, the second signaling field is a sounding reference signal resource indicator SRI signaling field.

Optionally, the uplink channel is a physical uplink control channel PUCCH, and the indication information is transmitted through at least one of radio resource control RRC layer information, medium access control MAC layer information, and physical layer control information, where
   the RRC layer information includes RRC signaling; the MAC layer information includes a MAC control element CE; and the physical layer control information includes DCI.

Optionally, in a case that the transmission parameter corresponds to N PUCCHs, the indication information includes a first sub indication information, the first sub indication information is used to indicate Q pieces of spatial relation information, and Q is an integer greater than or equal to N.

Optionally, the first sub indication information includes G groups of spatial relation information, and the spatial relation information of the G groups of spatial relation information constitutes the Q pieces of spatial relation information, where
   G is equal to 1; or, G is equal to N; or, a value of G is equal to the number of groups that the N PUCCHs are divided to.

Optionally, in a case that Q is greater than N, the indication information further includes second sub indication information, and the second sub indication information is used to indicate spatial relation information of each PUCCH of the N PUCCHs.

Optionally, in a case that the transmission parameter corresponds to at least two target transmissions of a target uplink channel, the indication information includes third sub indication information, and the third sub indication information is used to indicate spatial relation information of at least two target transmissions of the target uplink channel, where
   the number of pieces of spatial relation information is equal to or not equal to the number of target transmissions of the target uplink channel.

The network-side device 500 can implement the processes of the method embodiment in FIG. 2 of this disclosure, with the same beneficial effects achieved. To avoid repetition, details are not described again herein.

FIG. 6 is a first structural diagram of a terminal according to an embodiment of this disclosure. As shown in FIG. 6, the terminal 600 includes:
   a transmission module 601, configured to perform transmission of an uplink channel according to an uplink channel related transmission parameter, where the transmission parameter corresponds to N uplink channels and/or at least two target transmissions of a target uplink channel, and N is an integer greater than 1.

Optionally, the transmission parameter includes a predefined number of layers of an uplink channel, and the number of layers is 1.

Optionally, in a case that the transmission parameter corresponds to at least two target transmissions of a target uplink channel, the transmission parameter includes: a predefined first association between the number of target transmissions of a target uplink channel and precoding information, and/or a predefined second association between the number of target transmissions of a target uplink channel and spatial relation information.

Optionally, the terminal 600 further includes:
   a receiving module, configured to receive, before performing transmission of an uplink channel according to an uplink channel related transmission parameter, indication information sent by a network-side device, where the indication information is used to indicate the uplink channel related transmission parameter.

Optionally,
   in a case that the transmission parameter corresponds to N uplink channels, the N uplink channels correspond to M transmission and reception points TRPs, and M is an integer greater than 1; or
   in a case that the transmission parameter corresponds to at least two target transmissions of a target uplink channel, the target transmission is: a repeated transmission, a frequency hopping transmission, or a fractional transmission.

Optionally, the TRP is defined by at least one of the following: a control resource set or a control resource set group; an explicitly defined TRP; a transmission configuration indication state, a transmission configuration indication state list or a transmission configuration indication state pool; QCL information or QCL group information; spatial relation information or spatial relation group information; a physical downlink control channel PDCCH scrambling identifier or a PDCCH scrambling identifier group; a physical downlink shared channel PDSCH scrambling identifier or a PDSCH scrambling identifier group; a PDCCH-Config information element; and a PDSCH-Config information element.

Optionally, in a case that the uplink channel is a physical uplink shared channel PUSCH, the indication information is transmitted through downlink control information DCI.

Optionally, the DCI includes a first signaling field, and the first signaling field is used to indicate an uplink transmission scheme for the PUSCH, where the uplink transmission scheme includes at least one of the following: diversity based PUSCH, codebook based PUSCH, and non-codebook based PUSCH.

Optionally, the first signaling field is a precoding information and number of layers signaling field, and the precoding information and number of layers signaling field uses a first codepoint to indicate the uplink transmission scheme for the PUSCH.

Optionally, in a case that the first codepoint is a reserved codepoint, a new codepoint, a codepoint for which a transmitted precoding matrix indicator TPMI is a special value, or a codepoint for which the number of layers is a special value, the uplink transmission scheme for the PUSCH indicated by the first codepoint is: diversity based PUSCH or non-codebook based PUSCH.

Optionally, the DCI includes a second signaling field, and the second signaling field is used to indicate precoding information of the PUSCH.

Optionally, in a case that the precoding information corresponds to N codebook based PUSCHs, the second signaling field is a precoding information and number of layers signaling field; and the DCI uses one precoding information and number of layers signaling field to indicate precoding information of the N codebook based PUSCHs; or the DCI uses N precoding information and number of layers signaling fields to indicate precoding information of the N codebook based PUSCHs.

Optionally, in a case that the precoding information corresponds to a diversity based PUSCH, the second signaling field is a precoding information and number of layers signaling field, and the precoding information and number of layers signaling field uses a reserved codepoint to indicate precoding information of the diversity based PUSCH.

Optionally, in a case that the precoding information corresponds to at least two target transmissions of a target PUSCH, the DCI further includes a third signaling field, and the third signaling field is used to indicate the number of target transmissions of the target PUSCH.

Optionally, in a case that the precoding information corresponds to at least two target transmissions of a codebook based target PUSCH, the second signaling field is a precoding information and number of layers signaling field; or in a case that the precoding information corresponds to at least two target transmissions of a non-codebook based target PUSCH, the second signaling field is a sounding reference signal resource indicator SRI signaling field.

Optionally, the uplink channel is a physical uplink control channel PUCCH, and the indication information is transmitted through at least one of radio resource control RRC layer information, medium access control MAC layer information, and physical layer control information, where the RRC layer information includes RRC signaling; the MAC layer information includes a MAC control element CE; and the physical layer control information includes DCI.

Optionally, in a case that the transmission parameter corresponds to N PUCCHs, the indication information includes a first sub indication information, the first sub indication information is used to indicate Q pieces of spatial relation information, and Q is an integer greater than or equal to N.

Optionally, the first sub indication information includes G groups of spatial relation information, and the spatial relation information of the G groups of spatial relation information constitutes the Q pieces of spatial relation information, where G is equal to 1; or, G is equal to N; or, a value of G is equal to the number of groups that the N PUCCHs are divided to.

Optionally, in a case that Q is greater than N, the indication information further includes second sub indication information, and the second sub indication information is used to indicate spatial relation information of each PUCCH of the N PUCCHs.

Optionally, in a case that the transmission parameter corresponds to at least two target transmissions of a target uplink channel, the indication information includes third sub indication information, and the third sub indication information is used to indicate spatial relation information of at least two target transmissions of the target uplink channel, where the number of pieces of spatial relation information is equal to or not equal to the number of target transmissions of the target uplink channel.

Optionally, in a case that the number of pieces of spatial relation information is less than the number of target transmissions of the target uplink channel, the transmission module 601 is specifically configured to: perform J target transmissions of at least two target transmissions of the target uplink channel by reusing first spatial relation information in the spatial relation information.

Optionally, the J target transmissions are any one of the following transmissions:

an odd number of target transmissions of at least two target transmissions of the target uplink channel;

an even number of target transmissions of at least two target transmissions of the target uplink channel;

first J target transmissions of at least two target transmissions of the target uplink channel; and last J target transmissions of at least two target transmissions of the target uplink channel.

Optionally, in a case that the number of pieces of spatial relation information is less than the number of target transmissions of the target uplink channel, the transmission module 601 is specifically configured to: perform at least two target transmissions of the target uplink channel by using second spatial relation information in the spatial relation information, the number of pieces of second spatial relation information being equal to the number of target transmissions of the target uplink channel.

Optionally, the second spatial relation information is: first p pieces of spatial relation information in the spatial relation information that is arranged in order; or the second spatial relation information is: p pieces of spatial relation information with the smallest spatial distances to target spatial relation information in the spatial relation information;

where the target spatial relation information is spatial relation information used in historical transmission of an uplink channel corresponding to at least two target transmissions of the target uplink channel; and P is the number of target transmissions of the target uplink channel.

The terminal 600 can implement the processes of the method embodiment in FIG. 4 of this disclosure, with the same beneficial effects achieved. To avoid repetition, details are not described herein again.

FIG. 7 is a second structural diagram of a network-side device according to an embodiment of this disclosure. As shown in FIG. 7, a network-side device 700 includes a processor 701, a memory 702, a user interface 703, a transceiver 704, and a bus interface.

In this embodiment of this disclosure, the network-side device 700 further includes a computer program stored in the memory 702 and capable of running on the processor 701. When the computer program is executed by the processor 701, the following step is implemented:

sending indication information to a terminal, wherein the indication information is used to indicate an uplink channel related transmission parameter, the transmission parameter corresponds to N uplink channels and/or at least two target transmissions of a target uplink channel, and N is an integer greater than 1.

Optionally,
in a case that the transmission parameter corresponds to N uplink channels, the N uplink channels correspond to M transmission and reception points TRPs, and M is an integer greater than 1; or
in a case that the transmission parameter corresponds to at least two target transmissions of a target uplink channel, the target transmission is: a repeated transmission, a frequency hopping transmission, or a fractional transmission.

Optionally, the TRP is defined by at least one of the following: a control resource set or a control resource set group; an explicitly defined TRP; a transmission configuration indication state, a transmission configuration indication state list or a transmission configuration indication state pool; QCL information or QCL group information; spatial relation information or spatial relation group information; a physical downlink control channel PDCCH scrambling identifier or a PDCCH scrambling identifier group; a physical downlink shared channel PDSCH scrambling identifier or a PDSCH scrambling identifier group; a PDCCH-Config information element; and a PDSCH-Config information element.

Optionally, in a case that the uplink channel is a physical uplink shared channel PUSCH, the indication information is transmitted through downlink control information DCI.

Optionally, the DCI includes a first signaling field, and the first signaling field is used to indicate an uplink transmission scheme for the PUSCH, where
the uplink transmission scheme includes at least one of the following: diversity based PUSCH, codebook based PUSCH, and non-codebook based PUSCH.

Optionally, the first signaling field is a precoding information and number of layers signaling field, and the precoding information and number of layers signaling field uses a first codepoint to indicate the uplink transmission scheme for the PUSCH.

Optionally, in a case that the first codepoint is a reserved codepoint, a new codepoint, a codepoint for which a transmitted precoding matrix indicator TPMI is a special value, or a codepoint for which the number of layers is a special value, the uplink transmission scheme for the PUSCH indicated by the first codepoint is: diversity based PUSCH or non-codebook based PUSCH.

Optionally, the DCI includes a second signaling field, and the second signaling field is used to indicate precoding information of the PUSCH.

Optionally, in a case that the precoding information corresponds to N codebook based PUSCHs, the second signaling field is a precoding information and number of layers signaling field; and
the DCI uses one precoding information and number of layers signaling field to indicate precoding information of the N codebook based PUSCHs; or the DCI uses N precoding information and number of layers signaling fields to indicate precoding information of the N codebook based PUSCHs.

Optionally, in a case that the precoding information corresponds to a diversity based PUSCH, the second signaling field is a precoding information and number of layers signaling field, and the precoding information and number of layers signaling field uses a reserved codepoint to indicate precoding information of the diversity based PUSCH.

Optionally, in a case that the precoding information corresponds to at least two target transmissions of a target PUSCH, the DCI further includes a third signaling field, and the third signaling field is used to indicate the number of target transmissions of the target PUSCH.

Optionally,
in a case that the precoding information corresponds to at least two target transmissions of a codebook based target PUSCH, the second signaling field is a precoding information and number of layers signaling field; or
in a case that the precoding information corresponds to at least two target transmissions of a non-codebook based target PUSCH, the second signaling field is a sounding reference signal resource indicator SRI signaling field.

Optionally, the uplink channel is a physical uplink control channel PUCCH, and the indication information is transmitted through at least one of radio resource control RRC layer information, medium access control MAC layer information, and physical layer control information, where
the RRC layer information includes RRC signaling; the MAC layer information includes a MAC control element CE; and the physical layer control information includes DCI.

Optionally, in a case that the transmission parameter corresponds to N PUCCHs, the indication information includes a first sub indication information, the first sub indication information is used to indicate Q pieces of spatial relation information, and Q is an integer greater than or equal to N.

Optionally, the first sub indication information includes G groups of spatial relation information, and the spatial relation information of the G groups of spatial relation information constitutes the Q pieces of spatial relation information, where
G is equal to 1; or, G is equal to N; or, a value of G is equal to the number of groups that the N PUCCHs are divided to.

Optionally, in a case that Q is greater than N, the indication information further includes second sub indication information, and the second sub indication information is used to indicate spatial relation information of each PUCCH of the N PUCCHs.

Optionally, in a case that the transmission parameter corresponds to at least two target transmissions of a target uplink channel, the indication information includes third sub indication information, and the third sub indication information is used to indicate spatial relation information of at least two target transmissions of the target uplink channel, where
the number of pieces of spatial relation information is equal to or not equal to the number of target transmissions of the target uplink channel.

In FIG. 7, a bus architecture may include any quantity of interconnected buses and bridges, and specifically connect together various circuits of one or more processors represented by the processor 701 and a memory represented by the memory 702. The bus architecture may further interconnect various other circuits such as a peripheral device, a voltage regulator, and a power management circuit. These are all well known in the art, and therefore are not further described in this specification. The bus interface provides interfaces. The transceiver 704 may be a plurality of components, including a transmitter and a receiver, and provides units for communicating with a variety of other apparatuses on a transmission medium. For different user equipment, the user interface 703 may also be an interface capable of externally or internally connecting a required device, and the connected device includes but is not limited to a keypad, a display, a speaker, a microphone, a joystick, and the like.

The processor 701 is responsible for management of the bus architecture and general processing, and the memory 702 may store data for use by the processor 701 when the processor 701 performs an operation.

The network-side device 700 is capable of implementing the processes implemented by the network-side device in the foregoing method embodiments. To avoid repetition, details are not described herein again.

Figure 8:
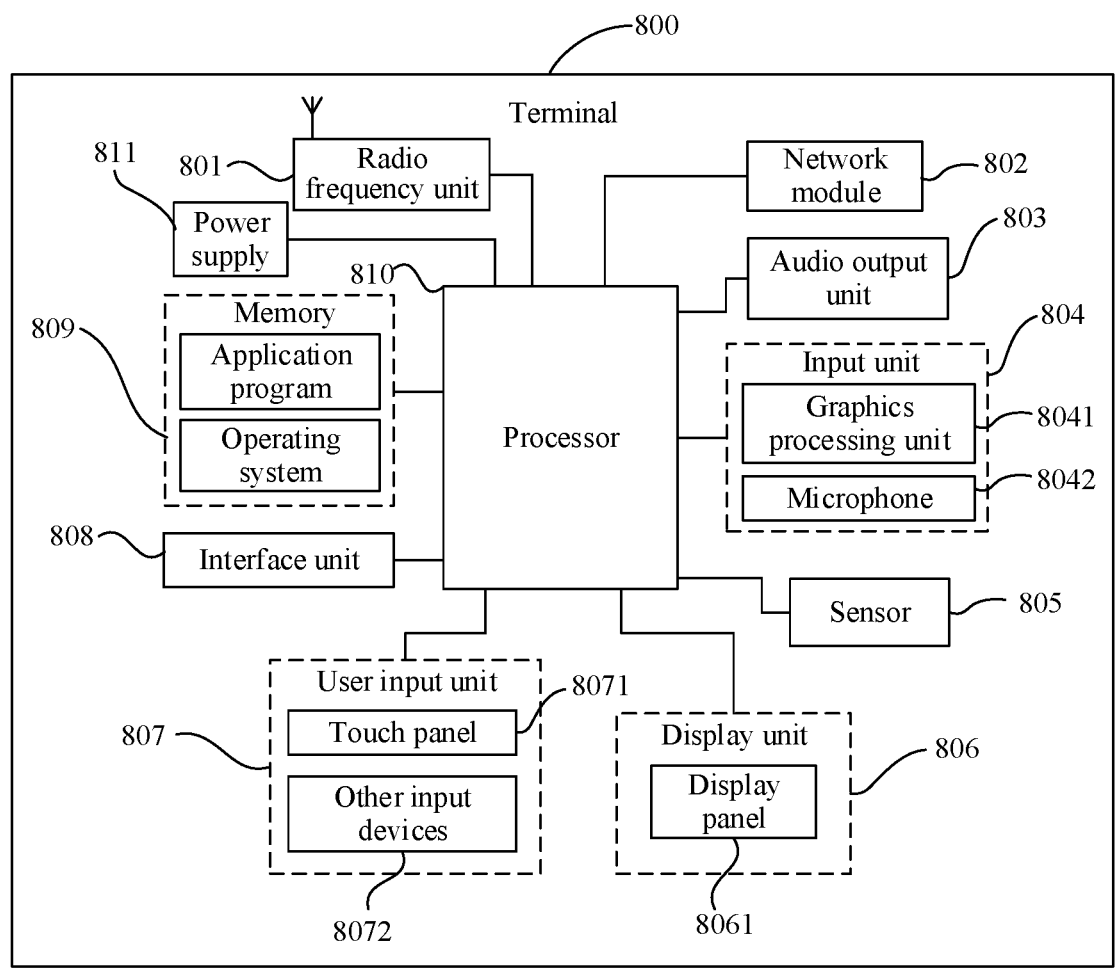
FIG. 8 is a second structural diagram of a terminal according to an embodiment of this disclosure.

FIG. 8 is a second structural diagram of a terminal according to an embodiment of this disclosure. The terminal may be a terminal implementing the embodiments of this disclosure. As shown in FIG. 8, the terminal 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that the structure of the terminal shown in FIG. 8 does not constitute a limitation on the terminal. The terminal may include more or fewer components than those shown in the figure, or combine some of the components, or employ a different component arrangement. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 801 is configured to:

perform transmission of an uplink channel according to an uplink channel related transmission parameter, where the transmission parameter corresponds to N uplink channels and/or at least two target transmissions of a target uplink channel, and N is an integer greater than 1.

Optionally, the transmission parameter includes a predefined number of layers of an uplink channel, and the number of layers is 1.

Optionally, in a case that the transmission parameter corresponds to at least two target transmissions of a target uplink channel, the transmission parameter includes: a predefined first association between the number of target transmissions of a target uplink channel and precoding information, and/or a predefined second association between the number of target transmissions of a target uplink channel and spatial relation information.

Optionally, the radio frequency unit 801 is further configured to:

before performing the transmission of an uplink channel according to an uplink channel related transmission parameter, receive indication information sent by a network-side device, where the indication information is used to indicate the uplink channel related transmission parameter.

Optionally,
in a case that the transmission parameter corresponds to N uplink channels, the N uplink channels correspond to M transmission and reception points TRPs, and M is an integer greater than 1; or
in a case that the transmission parameter corresponds to at least two target transmissions of a target uplink channel, the target transmission is: a repeated transmission, a frequency hopping transmission, or a fractional transmission.

Optionally, the TRP is defined by at least one of the following: a control resource set or a control resource set group; an explicitly defined TRP; a transmission configuration indication state, a transmission configuration indication state list or a transmission configuration indication state pool; QCL information or QCL group information; spatial relation information or spatial relation group information; a physical downlink control channel PDCCH scrambling identifier or a PDCCH scrambling identifier group; a physical downlink shared channel PDSCH scrambling identifier or a PDSCH scrambling identifier group; a PDCCH-Config information element; and a PDSCH-Config information element.

Optionally, in a case that the uplink channel is a physical uplink shared channel PUSCH, the indication information is transmitted through downlink control information DCI.

Optionally, the DCI includes a first signaling field, and the first signaling field is used to indicate an uplink transmission scheme for the PUSCH, where the uplink transmission scheme includes at least one of the following: diversity based PUSCH, codebook based PUSCH, and non-codebook based PUSCH.

Optionally, the first signaling field is a precoding information and number of layers signaling field, and the precoding information and number of layers signaling field uses a first codepoint to indicate the uplink transmission scheme for the PUSCH.

Optionally, in a case that the first codepoint is a reserved codepoint, a new codepoint, a codepoint for which a transmitted precoding matrix indicator TPMI is a special value, or a codepoint for which the number of layers is a special value, the uplink transmission scheme for the PUSCH indicated by the first codepoint is: diversity based PUSCH or non-codebook based PUSCH.

Optionally, the DCI includes a second signaling field, and the second signaling field is used to indicate precoding information of the PUSCH.

Optionally, in a case that the precoding information corresponds to N codebook based PUSCHs, the second signaling field is a precoding information and number of layers signaling field; and
the DCI uses one precoding information and number of layers signaling field to indicate precoding information of the N codebook based PUSCHs; or
the DCI uses N precoding information and number of layers signaling fields to indicate precoding information of the N codebook based PUSCHs.

Optionally, in a case that the precoding information corresponds to a diversity based PUSCH, the second signaling field is a precoding information and number of layers signaling field, and the precoding information and number of layers signaling field uses a reserved codepoint to indicate precoding information of the diversity based PUSCH.

Optionally, in a case that the precoding information corresponds to at least two target transmissions of a target PUSCH, the DCI further includes a third signaling field, and the third signaling field is used to indicate the number of target transmissions of the target PUSCH.

Optionally,
in a case that the precoding information corresponds to at least two target transmissions of a codebook based target PUSCH, the second signaling field is a precoding information and number of layers signaling field; or in a case that the precoding information corresponds to at least two target transmissions of a non-codebook based target PUSCH, the second signaling field is a sounding reference signal resource indicator SRI signaling field.

Optionally, the uplink channel is a physical uplink control channel PUCCH, and the indication information is transmitted through at least one of radio resource control RRC layer information, medium access control MAC layer information, and physical layer control information, where
the RRC layer information includes RRC signaling; the MAC layer information includes a MAC control element CE; and the physical layer control information includes DCI.

Optionally, in a case that the transmission parameter corresponds to N PUCCHs, the indication information includes a first sub indication information, the first sub indication information is used to indicate Q pieces of spatial relation information, and Q is an integer greater than or equal to N.

Optionally, the first sub indication information includes G groups of spatial relation information, and the spatial relation information of the G groups of spatial relation information constitutes the Q pieces of spatial relation information, where
G is equal to 1; or, G is equal to N; or, a value of G is equal to the number of groups that the N PUCCHs are divided to.

Optionally, in a case that Q is greater than N, the indication information further includes second sub indication information, and the second sub indication information is used to indicate spatial relation information of each PUCCH of the N PUCCHs.

Optionally, in a case that the transmission parameter corresponds to at least two target transmissions of a target uplink channel, the indication information includes third sub indication information, and the third sub indication information is used to indicate spatial relation information of at least two target transmissions of the target uplink channel, where
the number of pieces of spatial relation information is equal to or not equal to the number of target transmissions of the target uplink channel.

Optionally, in a case that the number of pieces of spatial relation information is less than the number of target transmissions of the target uplink channel, the radio frequency unit 801 is further configured to: perform J target transmissions of at least two target transmissions of the target uplink channel by reusing first spatial relation information in the spatial relation information.

Optionally, the J target transmissions are any one of the following transmissions:
an odd number of target transmissions of at least two target transmissions of the target uplink channel;
an even number of target transmissions of at least two target transmissions of the target uplink channel;
first J target transmissions of at least two target transmissions of the target uplink channel; and
last J target transmissions of at least two target transmissions of the target uplink channel.

Optionally, in a case that the number of pieces of spatial relation information is greater than the number of target transmissions of the target uplink channel, the radio frequency unit 801 is further configured to: perform at least two target transmissions of the target uplink channel by using second spatial relation information in the spatial relation information.

Optionally,
the second spatial relation information is: first p pieces of spatial relation information in the spatial relation information that is arranged in order; or
the second spatial relation information is: p pieces of spatial relation information with the smallest spatial distances to target spatial relation information in the spatial relation information;
where the target spatial relation information is spatial relation information used in historical transmission of an uplink channel corresponding to at least two target transmissions of the target uplink channel; and P is the number of target transmissions of the target uplink channel.

It should be noted that the terminal 800 in this embodiment may implement the processes of the method embodiments implemented by a terminal in the embodiments of this disclosure, with the same beneficial effects achieved. To avoid repetition, details are not described herein again.

It should be understood that, in this embodiment of this disclosure, the radio frequency unit 801 may be configured to transmit or receive a signal in an information transmitting/receiving or call process. Optionally, the radio frequency unit 801 receives downlink data from a base station and transmits the downlink data to the processor 810 for processing, and transmits uplink data to the base station. Generally, the radio frequency unit 801 includes but is not limited to an antenna, at least one amplifier, a transceiver, a coupler, a low noise amplifier, a duplexer, and the like. In addition, the radio frequency unit 801 may further communicate with a network and another device through a wireless communications system.

The terminal provides wireless broadband internet access for a user by using the network module 802, for example, helping the user send and receive e-mails, browse web pages, and access streaming media.

The audio output unit 803 may convert audio data received by the radio frequency unit 801 or the network module 802 or stored in the memory 809 into an audio signal and output the audio signal as a sound. In addition, the audio output unit 803 may further provide audio output (for example, a call signal reception tone or a message reception tone) that is related to a specific function performed by the terminal 800. The audio output unit 803 includes a speaker, a buzzer, a receiver, and the like.

The input unit 804 is configured to receive an audio signal or a video signal. The input unit 804 may include a graphics processing unit (GPU) 8041 and a microphone 8042. The graphics processing unit 8041 processes image data of a static picture or a video obtained by an image capture apparatus (for example, a camera) in an image capture mode or a video capture mode. A processed image frame may be displayed on the display unit 806. An image frame processed by the graphics processing unit 8041 may be stored in the memory 809 (or another storage medium) or transmitted by the radio frequency unit 801 or the network module 802. The microphone 8042 may receive a sound, and can process the sound into audio data. The processed audio data may be converted in a telephone call mode into a format that can be transmitted by the radio frequency unit 801 to a mobile communications base station, for outputting.

The terminal 800 further includes at least one sensor 805, for example, an optical sensor, a motion sensor, and other sensors. Optionally, the optical sensor includes an ambient light sensor and a proximity sensor. The ambient light sensor may adjust brightness of a display panel 8061 based on intensity of ambient light. When the terminal 800 moves near an ear, the proximity sensor may shut down the display panel 8061 and/or backlight. As a type of motion sensor, an accelerometer sensor can detect magnitudes of accelerations in all directions (usually three axes), can detect a magnitude and a direction of gravity when being static, and can be applied to terminal posture recognition (such as screen switching between portrait and landscape, related games, and magnetometer posture calibration), functions related to vibration recognition (such as pedometer and tapping), and the like. The sensor 805 may also include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information input by the user or information provided for the user. The display unit 806 may include the display panel 8061, and the display panel 8061 may be configured in a form of a liquid crystal display (LCD), an organic light-emitting diode (OLED), or the like.

The user input unit 807 may be configured to receive input digit or character information, and generate key signal input that is related to user setting and function control of the terminal. Optionally, the user input unit 807 includes a touch panel 8071 and other input devices 8072. The touch panel 8071, also referred to as a touchscreen, may capture a touch operation performed by a user on or near the touch panel (for example, an operation performed by the user on the touch panel 8071 or near the touch panel 8071 by using any appropriate object or accessory such as a finger or a stylus). The touch panel 8071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, transmits the point coordinates to the processor 810, and receives and executes a command transmitted by the processor 810. In addition, the touch panel 8071 may be implemented in a plurality of types, for example, as a resistive, capacitive, infrared, or surface acoustic wave touch panel. In addition to the touch panel 8071, the user input unit 807 may further include the other input devices 8072. Optionally, the other input devices 8072 may include but are not limited to a physical keyboard, a function key (for example, a volume control key or a power on/off key), a trackball, a mouse, a joystick, and the like. Details are not described herein.

Further, the touch panel 8071 may cover the display panel 8061. After detecting a touch operation on or near the touch panel 8071, the touch panel 8071 transmits the touch operation to the processor 810 for determining a type of the touch event. Then the processor 810 provides corresponding visual output on the display panel 8061 based on the type of the touch event. Although the touch panel 8071 and the display panel 8061 are used as two separate components to implement input and output functions of the terminal in FIG. 8, the touch panel 8071 and the display panel 8061 may be integrated to implement the input and output functions of the terminal in some embodiments. This is not specifically limited herein.

The interface unit 808 is an interface for connecting an external apparatus to the terminal 800. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 808 may be configured to receive input (for example, data information and electric power) from the external apparatus, and transmit the received input to one or more elements in the terminal 800; or may be configured to transmit data between the terminal 800 and the external apparatus.

The memory 809 may be configured to store software programs and various types of data. The memory 809 may mainly include a program storage area and a data storage area. The program storage area may store an operating system, an application program required by at least one function (for example, an audio play function or an image play function), and the like. The data storage area may store data (for example, audio data and a phone book) created based on usage of the mobile phone. In addition, the memory 809 may include a high-speed random access memory, and may further include a non-volatile memory such as a disk storage device, a flash memory device, or another volatile solid-state storage device.

The processor 810 is a control center of the terminal, and is connected to all components of the terminal by using various interfaces and lines. By running or executing a software program and/or a module stored in the memory 809 and invoking data stored in the memory 809, the processor 810 executes various functions of the terminal and processes data, so as to perform overall monitoring on the terminal. The processor 810 may include one or more processing units. Optionally, the processor 810 may integrate an application processor and a modem processor. The application processor mainly processes an operating system, a user interface, an application program, and the like. The modem processor mainly processes wireless communication. It may be understood that the modem processor may alternatively not be integrated into the processor 810.

The terminal 800 may further include a power supply 811 (for example, a battery) that supplies power to each component. Optionally, the power supply 811 may be logically connected to the processor 810 by using a power management system, so as to implement functions such as charging management, discharging management, and power consumption management by using the power management system.

In addition, the terminal 800 includes some functional modules that are not shown. Details are not described herein.

Optionally, an embodiment of this disclosure further provides a terminal, including a processor 810, a memory 809, and a computer program stored in the memory 809 and capable of running on the processor 810. When the computer program is executed by the processor 810, the processes of the foregoing embodiments of the uplink channel configuration method are implemented, with the same technical effects achieved. To avoid repetition, details are not described herein again.

An embodiment of this disclosure further provides a computer-readable storage medium, where the computer-readable storage medium stores a computer program. When the computer program is executed by a processor, the processes of the foregoing embodiments of the information reporting method are implemented, with the same technical effects achieved. To avoid repetition, details are not described herein. For example, the computer-readable storage medium is a read-only memory (ROM), a random access memory (RAM), a magnetic disk, or an optical disc.

It should be noted that the terms "include", "comprise", and any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, however, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections via some interfaces, apparatuses or units, and may be implemented in electrical, mechanical, or other forms.

The units described as separate parts may or may not be physically separate. Parts displayed as units may or may not be physical units, and may be located in one position or distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to related technologies, or some of the technical solutions may be embodied in a form of a software product. The computer software product is stored in a storage medium, and includes instructions for enabling a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The storage medium may be a magnetic disk, an optical disc, a ROM, a RAM, or the like.

It can be understood that the embodiments described in the embodiments of this disclosure may be implemented by hardware, software, firmware, middleware, microcode, or a combination thereof. For hardware implementation, the processing unit may be implemented in one or more application-specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented inside the processor or outside the processor.

The foregoing describes the embodiments of this disclosure with reference to the accompanying drawings. However, this disclosure is not limited to the foregoing specific implementations. The foregoing specific implementations are merely illustrative rather than restrictive. In light of this disclosure, a person of ordinary skill in the art may develop many other forms without departing from principles of this disclosure and the protection scope of the claims, and all such forms shall fall within the protection scope of this disclosure.

What is claimed is:

1. An uplink channel transmission method, comprising:
performing, by a terminal, transmission of an uplink channel according to an uplink channel related transmission parameter, wherein the transmission parameter corresponds to at least two target transmissions of a target uplink channel, and N is an integer greater than 1;
wherein before the performing transmission of an uplink channel according to an uplink channel related transmission parameter, the method further comprises:
receiving, by the terminal, indication information sent by a network-side device, wherein the indication information is used to indicate the uplink channel related transmission parameter;

wherein in a case that the transmission parameter corresponds to at least two target transmissions of a target uplink channel, the indication information comprises third sub indication information, and the third sub indication information is used to indicate spatial relation information of at least two target transmissions of the target uplink channel, wherein the number of pieces of spatial relation information is equal to or not equal to the number of target transmissions of the target uplink channel.

2. The method according to claim 1, wherein the transmission parameter comprises a predefined number of layers of an uplink channel, and the number of layers is 1.

3. The method according to claim 1, wherein in a case that the transmission parameter corresponds to at least two target transmissions of a target uplink channel, the transmission parameter comprises: a predefined first association between the number of target transmissions of a target uplink channel and precoding information, and/or a predefined second association between the number of target transmissions of a target uplink channel and spatial relation information.

4. The method according to claim 1, wherein in a case that the uplink channel is a physical uplink shared channel (PUSCH), the indication information is transmitted through downlink control information (DCI).

5. The method according to claim 4, wherein the DCI comprises a first signaling field, and the first signaling field is used to indicate an uplink transmission scheme for the PUSCH, wherein the uplink transmission scheme comprises at least one of the following: diversity based PUSCH, codebook based PUSCH, and non-codebook based PUSCH;

or, wherein the DCI comprises a second signaling field, and the second signaling field is used to indicate precoding information of the PUSCH.

6. The method according to claim 5, wherein the first signaling field is a precoding information and number of layers signaling field, and the precoding information and number of layers signaling field uses a first codepoint to indicate the uplink transmission scheme for the PUSCH.

7. The method according to claim 6, wherein in a case that the first codepoint is a reserved codepoint, a new codepoint, a codepoint for which a transmitted precoding matrix indicator (TPMI) is a special value, or a codepoint for which the number of layers is a special value, the uplink transmission scheme for the PUSCH indicated by the first codepoint is: diversity based PUSCH or non-codebook based PUSCH.

8. The method according to claim 5, wherein in a case that the precoding information corresponds to N codebook based PUSCHs, the second signaling field is a precoding information and number of layers signaling field; and the DCI uses one precoding information and number of layers signaling field to indicate precoding information of the N codebook based PUSCHs; or the DCI uses N precoding information and number of layers signaling fields to indicate precoding information of the N codebook based PUSCHs;

or, wherein in a case that the precoding information corresponds to a diversity based PUSCH, the second signaling field is a precoding information and number of layers signaling field, and the precoding information and number of layers signaling field uses a reserved codepoint to indicate precoding information of the diversity based PUSCH;

or, wherein in a case that the precoding information corresponds to at least two target transmissions of a target PUSCH, the DCI further comprises a third signaling field, and the third signaling field is used to indicate the number of target transmissions of the target PUSCH;

or, wherein in a case that the precoding information corresponds to at least two target transmissions of a codebook based target PUSCH, the second signaling field is a precoding information and number of layers signaling field; or in a case that the precoding information corresponds to at least two target transmissions of a non-codebook based target PUSCH, the second signaling field is a sounding reference signal resource indicator (SRI) signaling field.

9. The method according to claim 1, wherein the uplink channel is a physical uplink control channel (PUCCH), and the indication information is transmitted through at least one of radio resource control (RRC) layer information, medium access control (MAC) layer information, and physical layer control information, wherein the RRC layer information comprises RRC signaling; the MAC layer information comprises a MAC control element (CE); and the physical layer control information comprises DCI.

10. The method according to claim 9, wherein in a case that the transmission parameter corresponds to N PUCCHs, the indication information comprises a first sub indication information, the first sub indication information is used to indicate Q pieces of spatial relation information, and Q is an integer greater than or equal to N.

11. The method according to claim 10, wherein the first sub indication information comprises G groups of spatial relation information, and the spatial relation information of the G groups of spatial relation information constitutes the Q pieces of spatial relation information, wherein G is equal to 1; or, G is equal to N; or, a value of G is equal to the number of groups that the N PUCCHs are divided to;

and/or, wherein in a case that Q is greater than N, the indication information further comprises second sub indication information, and the second sub indication information is used to indicate spatial relation information of each PUCCH of the N PUCCHs.

12. The method according to claim 1, wherein in a case that the number of pieces of spatial relation information is less than the number of target transmissions of the target uplink channel, the performing transmission of an uplink channel according to an uplink channel related transmission parameter comprises:

performing J target transmissions of at least two target transmissions of the target uplink channel by reusing first spatial relation information in the spatial relation information;

or, wherein in a case that the number of pieces of spatial relation information is greater than the number of target transmissions of the target uplink channel, the performing transmission of an uplink channel according to an uplink channel related transmission parameter comprises:

performing at least two target transmissions of the target uplink channel by using second spatial relation information in the spatial relation information, the number of pieces of second spatial relation information being equal to the number of target transmissions of the target uplink channel.

13. The method according to claim 12, wherein the J target transmissions are any one of the following transmissions:
an odd number of target transmissions of at least two target transmissions of the target uplink channel;
an even number of target transmissions of at least two target transmissions of the target uplink channel;
first J target transmissions of at least two target transmissions of the target uplink channel; and
last J target transmissions of at least two target transmissions of the target uplink channel.

14. The method according to claim 12, wherein
the second spatial relation information is: first p pieces of spatial relation information in the spatial relation information that is arranged in order; or
the second spatial relation information is: p pieces of spatial relation information with the smallest spatial distances to target spatial relation information in the spatial relation information;
wherein the target spatial relation information is spatial relation information used in historical transmission of an uplink channel corresponding to at least two target transmissions of the target uplink channel; and P is the number of target transmissions of the target uplink channel.

15. The uplink channel transmission method according to claim 1, comprising:
performing, by a terminal, transmission of an uplink channel according to an uplink channel related transmission parameter, wherein the transmission parameter corresponds to N uplink channels.

16. The method according to claim 15, wherein
in a case that the transmission parameter corresponds to N uplink channels, the N uplink channels correspond to M transmission and reception points (TRPS), and M is an integer greater than 1; or
in a case that the transmission parameter corresponds to at least two target transmissions of a target uplink channel, the target transmission is: a repeated transmission, a frequency hopping transmission, or a fractional transmission.

17. The method according to claim 16, wherein the TRP is defined by at least one of the following: a control resource set or a control resource set group; an explicitly defined TRP; a transmission configuration indication state, a transmission configuration indication state list or a transmission configuration indication state pool; quasi co-location (QCL) information or QCL group information; spatial relation information or spatial relation group information; a physical downlink control channel (PDCCH) scrambling identifier or a PDCCH scrambling identifier group; a physical downlink shared channel (PDSCH) scrambling identifier or a PDSCH scrambling identifier group; a PDCCH-Config information element; and a PDSCH-Config information element.

18. A network-side device, comprising a processor, a memory, and a computer program stored in the memory and capable of running on the processor, wherein when the computer program is executed by the processor, an uplink channel configuration method is implemented, and the method comprises:
sending indication information to a terminal, wherein the indication information is used to indicate an uplink channel related transmission parameter, the transmission parameter corresponds to N uplink channels and/or at least two target transmissions of a target uplink channel, and N is an integer greater than 1;
wherein in a case that the transmission parameter corresponds to at least two target transmissions of a target uplink channel, the indication information comprises third sub indication information, and the third sub indication information is used to indicate spatial relation information of at least two target transmissions of the target uplink channel,
wherein the number of pieces of spatial relation information is equal to or not equal to the number of target transmissions of the target uplink channel.

19. A terminal, comprising a processor, a memory, and a computer program stored in the memory and capable of running on the processor, wherein when the computer program is executed by the processor, an uplink channel transmission method is implemented, and the method comprises:
performing transmission of an uplink channel according to an uplink channel related transmission parameter, wherein the transmission parameter corresponds to N uplink channels and/or at least two target transmissions of a target uplink channel, and N is an integer greater than 1;
wherein before the performing transmission of an uplink channel according to an uplink channel related transmission parameter, the method further comprises:
receiving, by the terminal, indication information sent by a network-side device, wherein the indication information is used to indicate the uplink channel related transmission parameter;
wherein in a case that the transmission parameter corresponds to at least two target transmissions of a target uplink channel, the indication information comprises third sub indication information, and the third sub indication information is used to indicate spatial relation information of at least two target transmissions of the target uplink channel,
wherein the number of pieces of spatial relation information is equal to or not equal to the number of target transmissions of the target uplink channel.

* * * * *